US011169087B2

(12) United States Patent
Popescu et al.

(10) Patent No.: US 11,169,087 B2
(45) Date of Patent: Nov. 9, 2021

(54) METHOD AND MEASUREMENT SYSTEM FOR DETERMINING FOREIGN GASES IN ETHYLENE

(71) Applicant: Siemens Aktiengesellschaft, Munich (DE)

(72) Inventors: Alexandru Popescu, Puchheim (DE); Thomas Hörner, Karlsruhe (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 16/632,236

(22) PCT Filed: Jul. 21, 2017

(86) PCT No.: PCT/EP2017/068538
§ 371 (c)(1),
(2) Date: Jan. 17, 2020

(87) PCT Pub. No.: WO2019/015784
PCT Pub. Date: Jan. 24, 2019

(65) Prior Publication Data
US 2020/0166454 A1 May 28, 2020

(51) Int. Cl.
*G01N 21/31* (2006.01)
*G01N 21/39* (2006.01)

(52) U.S. Cl.
CPC ......... *G01N 21/39* (2013.01); *G01N 21/3103* (2013.01); *G01N 2201/06113* (2013.01)

(58) Field of Classification Search
CPC ......... G01S 17/95; G01S 7/481; G01N 21/39; G01N 21/45; G01N 21/47; G01N 21/532;
(Continued)

(56) References Cited

U.S. PATENT DOCUMENTS 4,870,275 A * 9/1989 Ozdemir ............... G01N 21/39
250/574
8,358,417 B2 * 1/2013 Feitisch ............... G01N 21/031
356/440
(Continued)

FOREIGN PATENT DOCUMENTS

DE 102012223874 5/2014
EP 3081922 10/2016

OTHER PUBLICATIONS

Anonymous: "SpectraSensors TDLAS Analyzers for Olefins Production", Product Information, XP055437476, found on Internet: URL:https://www.spectrasensors.com/media/files/files/8bcccc14/SpectraSensors_Brochure_Olefins-LR.pdf, found on Dec. 21, 2017, the whole document; 2016.
(Continued)

*Primary Examiner* — Isiaka O Akanbi
(74) *Attorney, Agent, or Firm* — Cozen O'Connor

(57) ABSTRACT

Method and system in which, in order to determine foreign gases in ethylene with a degree of purity up to greater than 99%, a sample 2 of the ethylene in a measuring cell 1 is irradiated with light 14, wherein the wavelength of the light 14 is varied to scan selected absorption lines of the foreign gases in a wavelength-dependent manner, where the light 14 is detected after passing through the sample 2 to determine the concentrations of the foreign gases based on the wavelength-specific absorption of the light 14 at the points of the scanned absorption lines.

36 Claims, 17 Drawing Sheets

(58) Field of Classification Search
CPC ....... G01N 2021/398; G01N 2021/399; G01N 2021/4709; G01N 21/3103; G01N 2201/06113
USPC ............ 356/337, 436–437, 338, 28.5
See application file for complete search history.

(56) References Cited

U.S. PATENT DOCUMENTS

| | | | | |
|---|---|---|---|---|
| 8,903,474 | B2 * | 12/2014 | Yaniv | A61B 5/14551 600/475 |
| 9,347,877 | B2 * | 5/2016 | Hirata | G01N 21/3504 |
| 9,606,093 | B2 * | 3/2017 | Alquaity | G01N 21/39 |
| 10,677,713 | B1 * | 6/2020 | Yap | G01N 21/3504 |
| 2004/0191712 | A1 * | 9/2004 | Thomson | B23K 1/206 431/12 |
| 2010/0140478 | A1 * | 6/2010 | Wilson | G01N 21/031 250/339.07 |
| 2016/0305870 | A1 * | 10/2016 | Ooyama | G01N 21/3518 |
| 2018/0095031 | A1 * | 4/2018 | Owen | G01N 21/39 |

OTHER PUBLICATIONS

Johnstone Walter et al: "Tunable Diode Laser Spectroscopy for Industrial Process Applications: System Characterization in Conventional and New Approaches", IEEE Sensors Journal, IEEE Service Center, New York, NY, US, vol. 8, No. 7, pp. 1079-1088, XP011231360, ISSN: 1530-437X, DOI: 10.1109/JSEN.2008. 926168; 2008.

Kluczynski P et al: "Detection of acetylene impurities in ethylene and polyethylene manufacturing processes using tunable diode laser spectroscopy in the 3-μm range", Applied Physics B ; Lasers and Optics, Springer, Berlin, DE, vol. 105, No. 2, pp. 427-434, XP19964614, ISSN: 1432-0649, DOI: 10.1007/S00340-011-4645-6, description, abstract; sections 1-3; figure 1, 2, 4; 2011.

Lundqvist S et al: "Process analytical applications in the mid-infrared", Quantum Sensing and Nanophotonic Devices VIII, SPIE, 1000 20th St. Bellingham WA 98225-6705 USA, vol. 7945, No. 1, pp. 1-10, XP060010423, DOI: 10.1117/12.871571, found on Jan. 1, 1901, abstract, sections 1, 2.1, 3, 3.2, figure 2, 4, 6; 2011.

PCT International Search Report dated Jan. 8, 2018 based on PCT/EP2017/068538 filed Jul. 21, 2017.

* cited by examiner

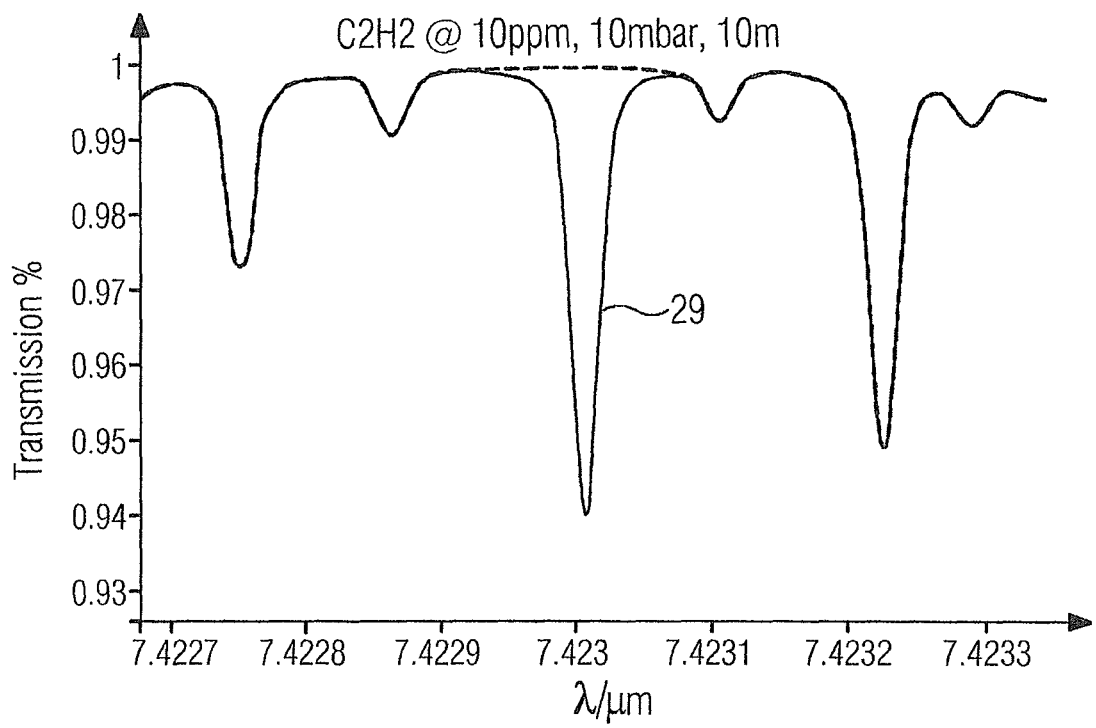
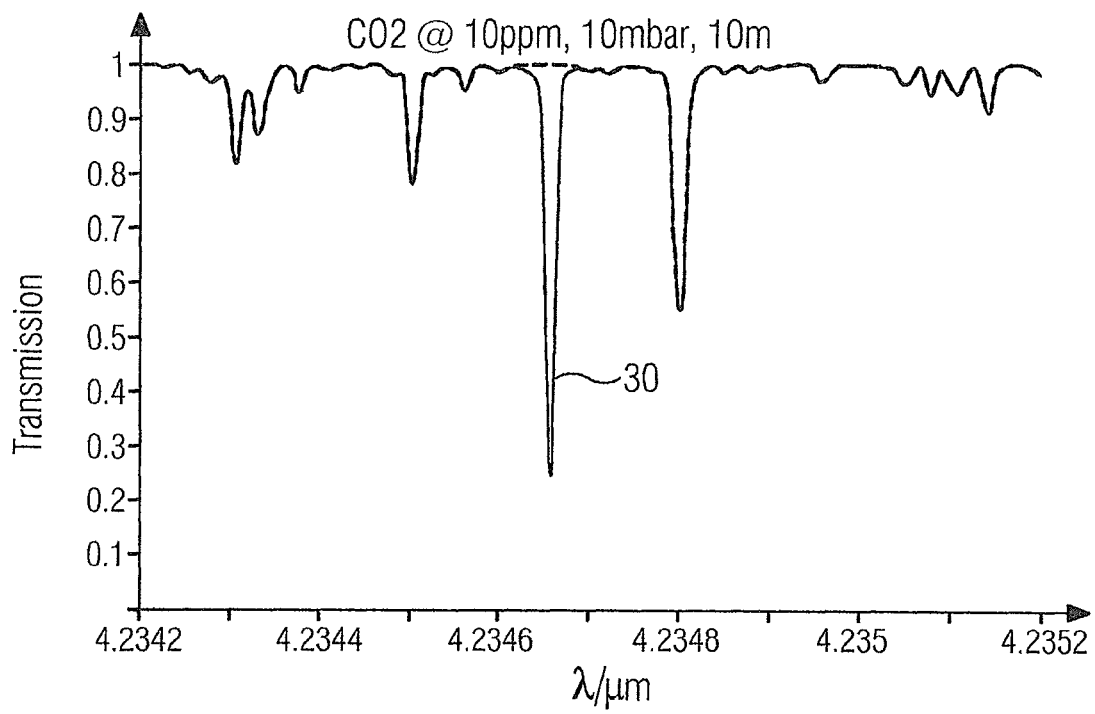

METHOD AND MEASUREMENT SYSTEM FOR DETERMINING FOREIGN GASES IN ETHYLENE

CROSS-REFERENCE TO RELATED APPLICATIONS

This is a U.S. national stage of application No. PCT/EP2017/068538 filed Jul. 21, 2017.

BACKGROUND OF THE INVENTION

1. Field of the Invention

The invention relates to a method and a measurement system for determining foreign gases in ethylene with a degree of purity up to greater than 99%.

2. Description of the Related Art

Ethylene (ethene) is one of the most important raw materials of the chemical industry and the starting product for a plurality of petrochemical products (e.g., polyethylene, polyvinyl acetate, polystyrene, polyvinyl chloride, cellulose acetate). Ethylene is produced on an industrial scale by thermal cracking of mineral oil fractions (e.g., naphtha, gas oil) or gaseous hydrocarbons in the presence of steam (Steam Cracking). The resulting cracking gases are subjected to a multi-stage distillative work-up until the pure end products, including ethylene, are present. Distillation is complicated because very high degrees of purity are required. Thus, ethylene must be present in purities of more than 99% in order to be able to be used in polymerization.

In order to meet the high purity requirement in the production of ethylene and, if necessary, to be able to influence the process, it is necessary to rapidly measure the smallest concentrations of foreign gases in the end product.

P. Kluczynski et al.: "Detection of acetylene impurities in ethylene and polyethylene manufacturing processes using tunable diode laser spectroscopy in the 3-µm range", Applied Physics B: Lasers and Optics, No. 2, p. 427-434, 2011, demonstrates the possibility of detecting impurities of pure ethylene by acetylene (ethyne) in a measurement range of 0-5 ppm via diode laser absorption spectroscopy (Tunable Diode Laser Absorption Spectroscopy (TDLAS)) in an acetylene absorption band between 2975 and 3125 nm, which is free from influences of interfering hydrocarbons such as ethylene, ethane, propane and propylene (propene). In this wavelength interval, strong isolated acetylene lines are present, of which the absorption line around 3059.56 nm is used for determining the acetylene concentration in the study presented. Measurement is performed in accordance with the Wavelength Modulation Spectroscopy (WMS) method, where the wavelength of the light of a tunable diode laser varies periodically over the absorption line of interest and is additionally modulated sinusoidally with high frequency and small amplitude; the intensity of the light is detected after passing through the ethylene contaminated with acetylene and evaluated at twice the modulation frequency (2f-WMS).

SUMMARY OF THE INVENTION

It is an object of the invention to provide a system and method for checking the purity of ethylene during the production thereof.

This and other objects and advantages are achieved in accordance with the invention by a measurement system and a method for determining foreign gases in ethylene with a degree of purity up to greater than 99%, where a sample of the ethylene in a measuring cell is irradiated with light, the wavelength of the light is varied to scan selected absorption lines of the foreign gases in a wavelength-dependent manner, the light is detected after passing through the sample, and the concentrations of the foreign gases are determined based on the wavelength-specific absorption of the light at the points of the scanned absorption lines, and where the concentrations of the foreign gases acetylene, carbon dioxide, carbon monoxide and ammonia can be determined based on the basis of the absorptions at one of their following absorption lines in each case for acetylene absorption lines at 3.02575 µm, 3.0223 µm, 3.0099 µm or 7.423 µm, carbon dioxide absorption lines at 4.2347 µm, 4.2396 µm, 4.23225 µm or 4.2875 µm, carbon monoxide absorption lines at 4.61 µm, 4.58765 µm or 4.74515 µm, and for ammonia absorption lines at 6.1496 µm, 6.4046 µm, 6.4066 µm or 6.18425 µm.

It is also an object of the invention to provide a measurement system for determining foreign gases in ethylene with a degree of purity up to greater than 99%, which has a measuring cell for receiving a sample of the ethylene, a light source which can be tuned in relation to the wavelength and passes through the measuring cell, a control device that controls the light source, having a detector which detects the light of the light source after shining through the sample, and which has an evaluation device which is arranged downstream of the detector and determines the concentrations of foreign gases based on their wavelength-specific absorption of the light, where the light source and control device are configured to tune the wavelength of the light over a range that contains one of the following absorption lines for each of the foreign gases acetylene, carbon dioxide, carbon monoxide and ammonia, and the evaluation device is designed to determine the concentrations of the foreign gases acetylene, carbon dioxide, carbon monoxide and ammonia on the basis of the absorptions for one of these absorption lines in each case for acetylene absorption lines at 3.02575 µm, 3.0223 µm, 3.0099 µm or 7.423 µm, carbon dioxide absorption lines at 4.2347 µm, 4.2396 µm, 4.23225 µm or 4.2875 µm, carbon monoxide absorption lines at 4.61 µm, 4.58765 µm or 4.74515 µm, and for ammonia absorption lines at 6.1496 µm, 6.4046 µm, 6.4066 µm or 6.18425 µm.

The concentrations of the measured foreign gases (target gases) acetylene, carbon dioxide, carbon monoxide and ammonia are decisive for the quality and further usability of ethylene. The expected concentrations of these target gases are in the range of 0 to 10 ppm, but their measurement is made more difficult in a sufficient spectral resolution by the strong absorption of ethylene and by other foreign gases such as water, hydrogen, methane and ethane. The absorption lines used in accordance with the invention for determining the concentration of the target gases mentioned have the advantage that they are not influenced by the product gas ethylene or by one another or only to a very small extent, and thus enable accurate measurement with a detection limit of up to 10 ppb.

No individual light sources are currently available, the tuning range of which is large enough to simultaneously scan the selected absorption lines of the different target gas in a wavelength-dependent manner. As a result, the light for transilluminating the sample is generated via a light source that comprises a plurality of individual light sources. Semiconductor lasers come into consideration as individual light sources, preferably using a Quantum Cascade Laser (QCL), Interband Cascade Laser (ICL) or Vertical Cavity Surface Emitting Laser (VCSEL). The lasers can be realized as separate laser modules or in the form of an array on a substrate. The light generated by the different lasers can be coupled into the sample via a beam combiner (for example, a fiber coupler, semitransparent mirror, collimator optics, refractive, diffractive or dispersive elements such as a prism or grating) in order to impinge upon the detector after it has been irradiated. The lasers can be controlled successively in time-division multiplex and/or for individual modulation of the light generated by them, so that the detected light can be evaluated separately after the individual lasers.

In accordance with an advantageous embodiment of the method in accordance with the invention, in addition to concentrations of acetylene, carbon dioxide, carbon monoxide and ammonia, concentrations of the further foreign gases methane and/or ethane are also determined based on absorption at one of their following absorption lines in each case for methane absorption lines at 3.53571 µm, 3.53595 µm or 3.58134 µm and for ethane absorption lines at 6.40545 µm, 6.40574 µm, 6.40646 µm, 6.40707 µm, 6.40737 µm, 6.40782 µm, 6.4082 µm or 6.40962 µm.

Because of their proximity to the above-mentioned ammonia absorption lines at 6.4046 µm or 6.4066 µm, each of the aforementioned ethane absorption lines can be scanned together with the one or the other of these two ammonia absorption lines in a wavelength-dependent manner, so that no further laser is required for the measurement of ethane.

The same applies to the determination of the concentration of water on the basis of the absorption at the water absorption line at 6.1854 µm, where in this case the water absorption line and the ammonia absorption line can be scanned together in a wavelength-dependent manner at 6.18425 µm with the aid of only one laser.

In an advantageous embodiment of the method in accordance with the invention, when determining the concentrations of the different foreign gases, the respectively adjacent ethylene spectra are also evaluated to determine the ethylene concentration and thus the yield of the ethylene production process in the respectively monitored stage. In detail, the following ethylene absorption lines can be scanned together with the absorption lines of the foreign gases:

Ethylene absorption lines at 3.02529 µm, 3.02556 µm, 3.02559 µm, 3.0258 µm or 3.02588 µm in proximity to the acetylene absorption line at 3.02575 µm;

Ethylene absorption lines at 3.02217 µm, 3.02229 µm, 3.02235 µm, 3.02249 µm or 3.02265 µm in proximity to the acetylene absorption line at 3.0223 µm;

Ethylene absorption lines at 3.00919 µm, 3.00937 µm, 3.00947 µm, 3.0096 µm, 3.00979 µm, 3.00993 µm or 3.00999 µm in proximity to the acetylene absorption line at 3.0099 µm;

Ethylene absorption lines at 7.42398 µm, 7.42435 µm or 7.42483 µm in proximity to the acetylene absorption line at 7.423 µm;

Ethylene absorption lines at 4.2343 µm, 4.2345 µm or 4.2348 µm in proximity to the carbon dioxide absorption line at 4.2347 µm;

Ethylene absorption lines at 4.2393 µm, 4.2394 µm or 4.2397 µm in proximity to the carbon dioxide absorption line at 4.2396 µm;

Ethylene absorption lines at 4.23168 µm, 4.23195 µm, 4.2322 µm, 4.2323 µm or 4.2328 µm in proximity to the carbon dioxide absorption line at 4.23225 µm;

Ethylene absorption lines at 4.2874 µm, 4.2876 µm, 4.2877 µm or 4.2878 µm in proximity to the carbon dioxide absorption line at 4.2875 µm;

Ethylene absorption lines at 4.6096 µm, 4.6097 µm, 4.6098 µm or 4.6099 µm in proximity to the carbon monoxide absorption line at 4.61 µm;

Ethylene absorption lines at 4.5872 µm, 4.5873 µm, 4.5875 µm, 4.5877 µm, 4.5878 µm or 4.5879 µm in proximity to the carbon monoxide absorption line at 4.58765 µm;

Ethylene absorption lines at 4.74417 µm, 4.7449 µm, 4.74517 µm, 4.74527 µm or 4.74537 µm in proximity to the carbon monoxide absorption line at 4.74515 µm;

Ethylene absorption lines at 6.1483 µm, 6.1484 µm, 6.14912 µm, 6.14965 µm, 6.14979 µm, 6.14996 µm or 6.15022 µm in proximity to the ammonia absorption line at 6.1496 µm;

Ethylene absorption lines at 6.40146 µm, 6.40156 µm, 6.40471 µm, 6.40594 µm or 6.40651 µm in proximity to the ammonia absorption line at 6.4046 µm or 6.4066 µm;

Ethylene absorption lines at 6.181 µm, 6.182 µm, 6.1838 µm, 6.1841 µm, 6.1844 µm, 6.1866 µm, 6.1881 µm, 6.1883 µm or 6.1892 µm in proximity to the ammonia absorption line at 6.18425 µm;

Ethylene absorption lines at 3.53569 µm, 3.53577 µm or 3.53599 µm in proximity to the methane absorption line at 3.53571 µm or 3.53595 µm;

Ethylene absorption lines at 3.58107 µm, 3.58113 µm, 3.58115 µm, 3.58119 µm, 3.58129 µm, 3.58142 µm, 3.58145 µm or 3.58158 µm in proximity to the methane absorption line at 3.58134 µm;

Ethylene absorption lines at 6.40594 µm, 6.40651 µm, 6.40681 µm, 6.40906 µm or 6.40922 µm in proximity to the ethane absorption line at 6.40545 µm, 6.40574 µm, 6.40646 µm, 6.40707 µm, 6.40737 µm, 6.40782 µm, 6.4082 µm or 6.40962 µm.

In the last-mentioned wavelength window of 6.4 µm to 6.41 µm, the above-mentioned ammonia absorption lines are also 6.4046 µm and 6.4066 µm, so that simultaneous measurement of ammonia, ethane and ethylene is possible with only one laser.

Spectral measurement is performed in a measuring cell in which a sample of the ethylene is preferably maintained at a reduced pressure in a range between 10 mbar and 200 mbar, preferably less than 100 mbar and particularly preferably in a range between 10 mbar and 30 mbar, in order to reduce the width of the absorption lines and thus to obtain the desired spectral resolution. In particular, the reduction of the line widths of the ethylene present at a concentration of over 99% leads to the opening of measurement windows for the target gases to be measured. The target gases are measured by extracting the sample continuously or discontinuously from the ethylene production process and feeding it to the measuring cell. Here, the pressure of the gas is reduced from the original process pressure (typically 35 bar) to the desired measurement pressure.

Measurement is preferably performed in a temperature range of approximately 15° C. to 50° C. The process temperature is also in this temperature range. In order to achieve the desired detection limit and accuracy of 10 ppb, it is advantageous to know or measure the measuring temperature in order to take it into account when calculating the concentrations of the target gases (foreign gases) from the detected wavelength-specific absorptions, or to keep the measuring temperature constant, for example, via control.

In order to achieve a high measuring sensitivity and the desired detection limit, a multi-pass measuring cell having a multiply folded beam path can be used, the length of the beam path being between 5 m and 100 m, preferably approximately 10 m or greater.

Measurement can be performed in accordance with the method of direct absorption spectroscopy or wavelength modulation spectroscopy (WMS), where both methods can also be combined with one another, as is known, for example, from DE 10 2012 223 874 B3. In both cases, the wavelength of the generated light is varied periodically over the respective absorption lines of interest of the target gases and the intensity of the light detected after transillumination of the sample is evaluated in a wavelength-dependent manner. In the case of the WMS, the wavelength is additionally modulated sinusoidally with high frequency and small amplitude and the detected light intensity is evaluated at a higher harmonic of the modulation frequency, for example the second harmonic. In order to improve the signal-to-noise ratio, the detected light intensity can also be evaluated at the modulation frequency and/or at further higher harmonics.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail hereinafter by way of example with reference to the drawings, which show diagrammatically and not to scale, in which:

FIGS. 2 to 32 are graphical plots of absorption spectra in regions of absorption lines of the foreign gases selected for measurement in accordance with the invention.

DETAILED DESCRIPTION OF THE EXEMPLARY EMBODIMENTS

Figure 1:
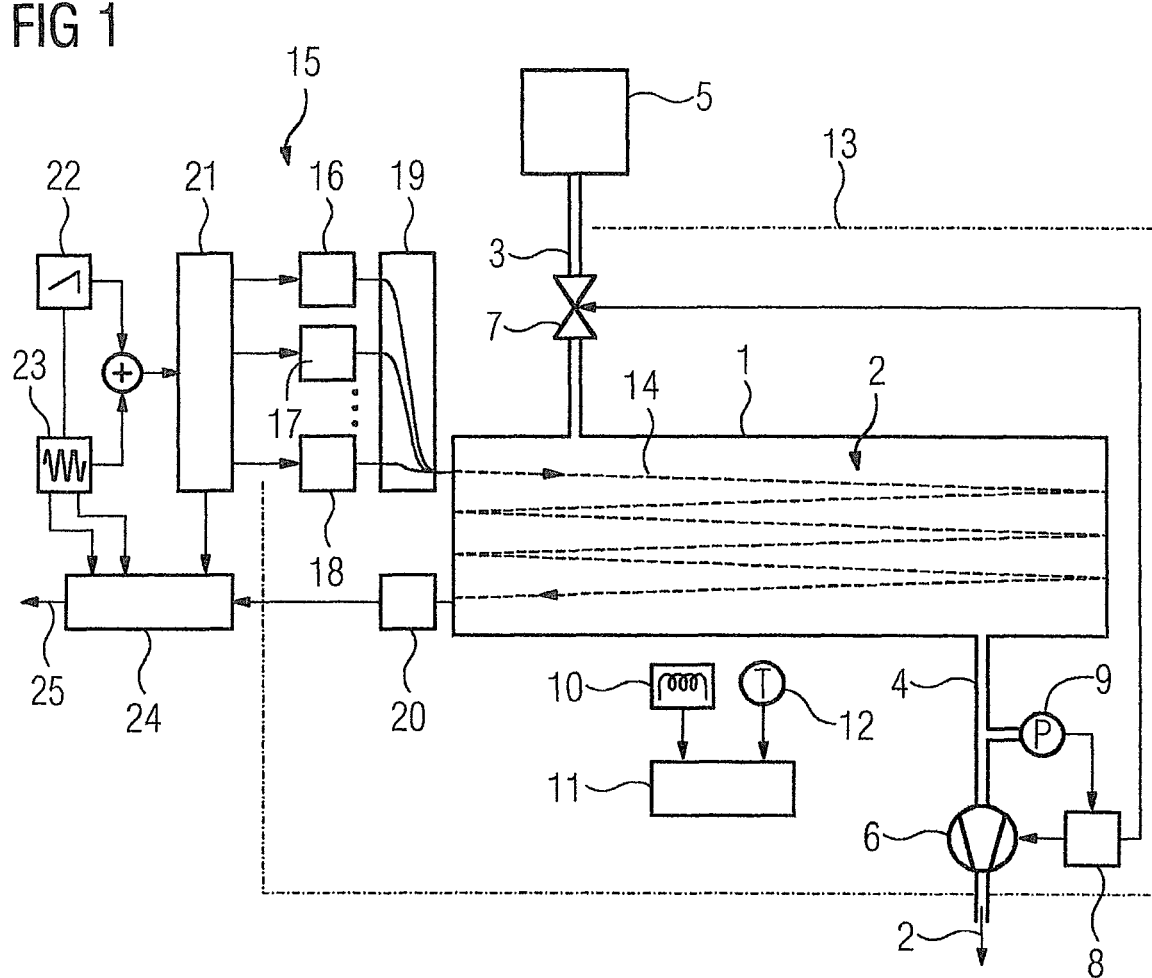
FIG. 1 is a schematic block diagram of a measurement system for determining foreign gases in ethylene in accordance with the invention

FIG. 1 shows a very simplified diagrammatic view of a measurement system with a measuring cell 1 for receiving a gas sample 2 to be analyzed, which is introduced into the measuring cell 1 via a first gas line 3 and passed out of the measuring cell 1 via a second gas line 4. The first gas line 3 leads from the measuring cell 1 to a removal point, e.g., a bypass sampling system (fast loop), into an ethylene production process 5. The production process 5 comprises a multi-stage distillation process in which cracking gases obtained beforehand by steam cracking are divided into their individual constituents until pure product gases, including ethylene, are present. In the various distillation stages, the product gases are present together with foreign gases in different concentrations, where the concentration of the product gas is higher in each higher stage and the concentrations of the foreign gases is lower than in the stage below. Each last stage contains the high-purity product gas, e.g., ethylene with a degree of purity of more than 99%, and only traces of the foreign gas. To check or monitor the purity of the ethylene, the foreign gas acetylene, carbon dioxide, carbon monoxide and ammonia should be detected and their concentrations determined via the measuring system. In order to control the distillation in an optimum manner, it is advantageous to equip not only the last distillation stage but also preceding or all stages with identical measuring systems.

The ethylene sample 2 taken from the production process 5 is sucked into the second gas line 4 via a pump 6, where the gas pressure in the measuring cell 1 is reduced to approximately 10 mbar in collaboration with a throttle or a valve 7 in the first gas line 3. The ethylene sample 2 can be removed continuously or discontinuously from the process 5. The pump 6 and optionally the valve 7 are controlled or regulated by a control device 8 as a function of the negative pressure in the measuring cell 1 detected by a pressure sensor 9 to keep the gas pressure in the measuring cell 1 constant during measurement.

In order to keep the measuring temperature constant, the measuring chamber 1 can be temperature-controlled via a heating element 10 or optionally a cooling element. The temperature is controlled by a controller 11 as a function of a temperature detected at the measuring chamber 1 via a temperature sensor 12. A transistor that serves at the same time as a heating element and temperature sensor is also suitable as the heating element, so that no complex control is required to keep the temperature constant. In order to keep the measuring temperature constant, the measuring chamber can alternatively or additionally be arranged in a container 13, merely indicated here, of insulating material, such as polystyrene hard foam or expanded polypropylene (EPP).

The measuring cell 1 is formed as a multipass measuring cell, such as a Herriot cell or White cell, which is irradiated by the light 14 of a wavelength-tunable light source 15. The light source 15 comprises a plurality of individual light sources 16, 17, 18 in the form of semiconductor lasers, the light of which is introduced into the measuring cell 1 via a beam combiner 19, such as a fiber coupler. Within the measuring cell 1, the light 14 is reflected multiple times before it falls onto a detector 20, where an absorption distance of the order of magnitude of 10 m is achieved via multiple reflection. The individual light sources 16, 17, 18 are periodically controlled in succession by a first signal generator 22 with a ramp-shaped or triangular current via a multiplexer 21 to tune the light generated by them over predetermined wavelength ranges in the central infrared range in which selected absorption lines of the foreign gases (target gases) to be determined are acetylene, carbon dioxide, carbon monoxide and ammonia. In order to measure the principle of wavelength modulation spectroscopy (WMS), the ramp-shaped or triangular current can be modulated at a predetermined frequency f at the same time via a second signal generator 23. The lasers 16, 17, 18 can also be controlled by individually assigned signal generators, so that the multiplexer 21 can then be omitted. An evaluation device 24 arranged downstream of the detector 20 evaluates the intensity of the light 14 at the points of the selected absorption lines of the target gases in a phase-sensitive manner at one or more higher harmonics of the modulation frequency f, for example, the second harmonic 2f, and determines therefrom as an analysis result 25 the concentrations of the foreign gases acetylene, carbon dioxide, carbon monoxide and ammonia in the ethylene sample 2.

The concentrations of the above-mentioned foreign or target gases are determined based on one of the following absorption lines in each case for acetylene absorption lines at 3.02575 µm, 3.0223 µm, 3.0099 µm or 7.423 µm, carbon dioxide absorption lines at 4.2347 µm, 4.2396 µm, 4.23225

µm or 4.2875 µm, carbon monoxide absorption lines at 4.61 µm, 4.58765 µm or 4.74515 µm, and for ammonia absorption lines at 6.1496 µm, 6.4046 µm, 6.4066 µm or 6.18425 µm.

As no individual light sources are available at present, the tuning range of which is large enough to simultaneously scan the selected absorption lines of the various target gases acetylene, carbon dioxide, carbon monoxide and ammonia as a function of wavelength, four lasers 16, 17, 18 are required for which quantum cascade lasers, interband cascade lasers or VCSELs come into consideration and which can be realized as separate laser modules or in the form of an array on a substrate. VCSELS to over 3 µm are already technically producible and can therefore be used for the measurement of acetylene. As shown in the example of FIG. 1, the lasers 16, 17, 18 can be controlled in the multiplex method. However, it is also possible to control them simultaneously and to modulate them at different frequencies $f_{16}$, $f_{17}$, $f_{18}$, where the detected light 14 is evaluated to distinguish the absorptions by the various target gases at the harmonics $nf_{16}$, $nf_{17}$, $nf_{18}$ ($n \geq 1$) of the modulation frequencies.

The following FIGS. 2 to 15 show, by way of example, graphical plots of the absorption spectrum of the ethylene sample 2 in the regions of the abovementioned absorption lines of the target gases acetylene, carbon dioxide, carbon monoxide and ammonia in the presence of the following gas matrix "perturber gas":

Water: <2 ppm
Hydrogen: Traces
Methane: 50-200 ppm
Ethane: 300 ppm
Ethylene: 99%

Figure 2:
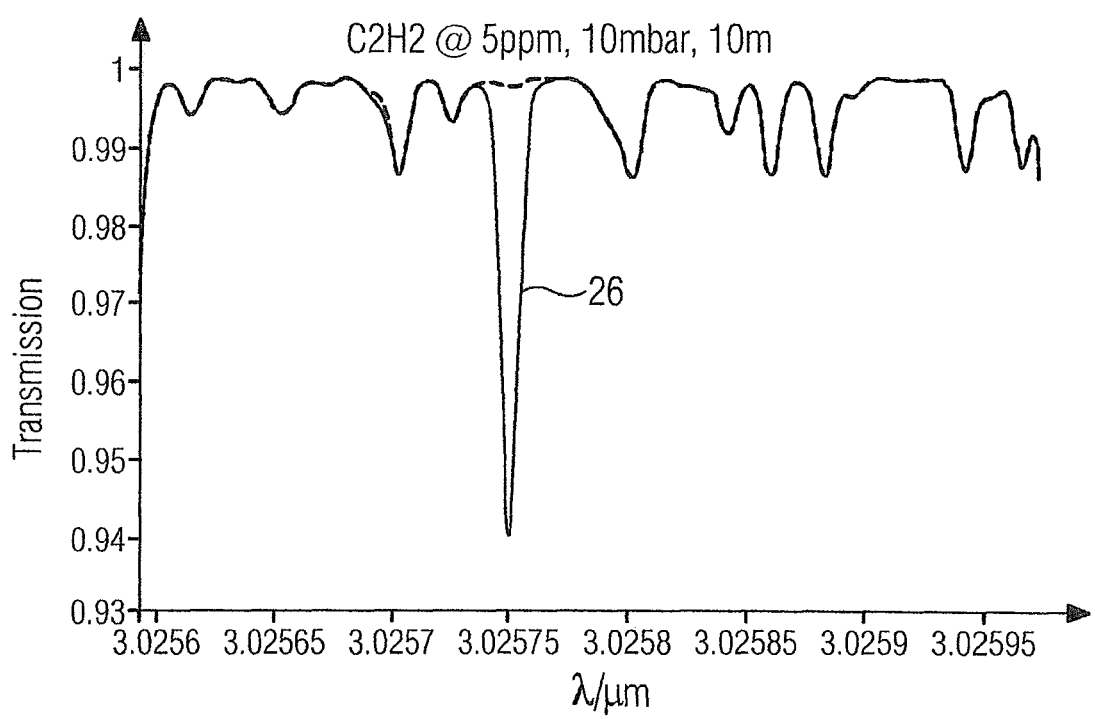

FIG. 2 shows the absorption spectrum of the gas sample 2 in the region of acetylene absorption line 26 at 3.02575 µm.

Figure 3:
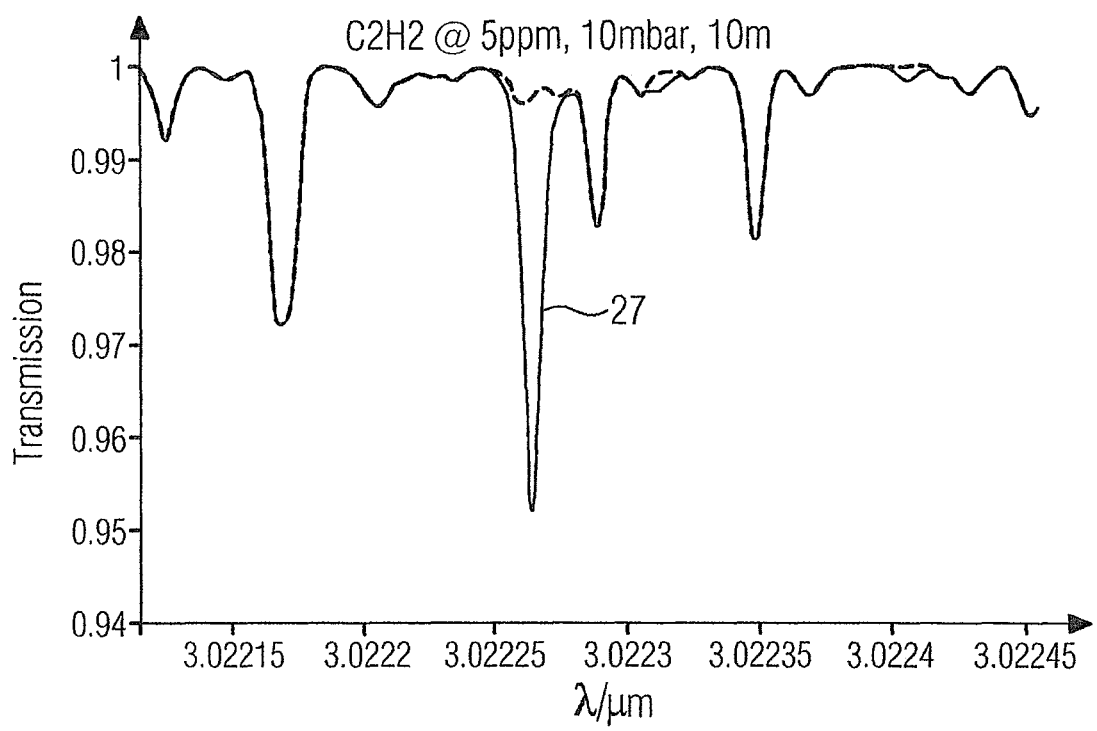

FIG. 3 shows the absorption spectrum of the gas sample 2 in the region of acetylene absorption line 27 at 3.0223 µm.

Figure 4:
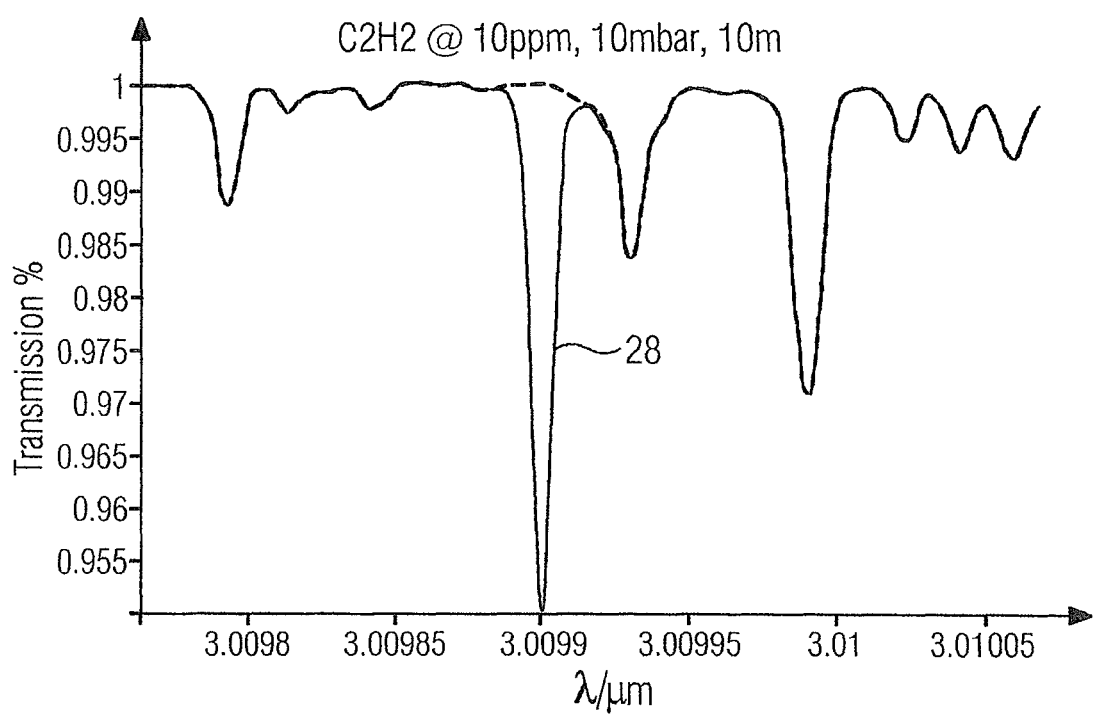

FIG. 4 shows the absorption spectrum of the gas sample 2 in the region of acetylene absorption line 28 at 3.0099 µm.

FIG. 5 shows the absorption spectrum of the gas sample 2 in the region of acetylene absorption line 29 at 7.423 µm.

FIG. 6 shows the absorption spectrum of the gas sample 2 in the region of carbon dioxide absorption line 30 at 4.2347 µm.

Figure 7:
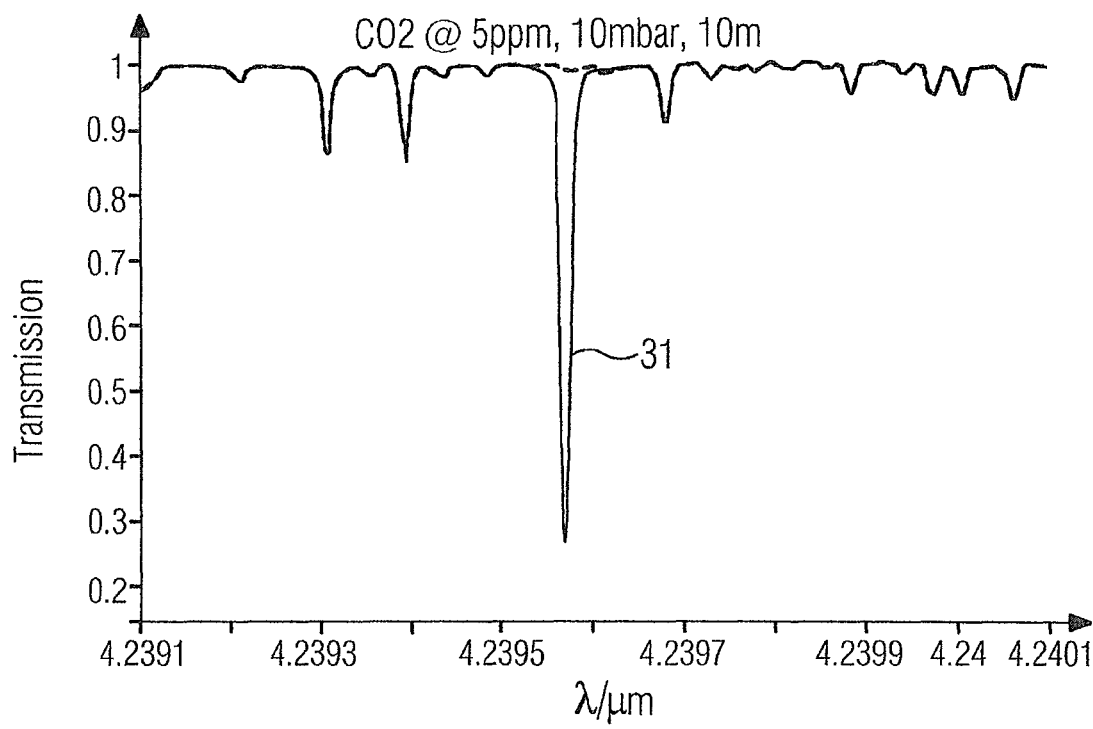

FIG. 7 shows the absorption spectrum of the gas sample 2 in the region of carbon dioxide absorption line 31 at 4.2396 µm.

Figure 8:
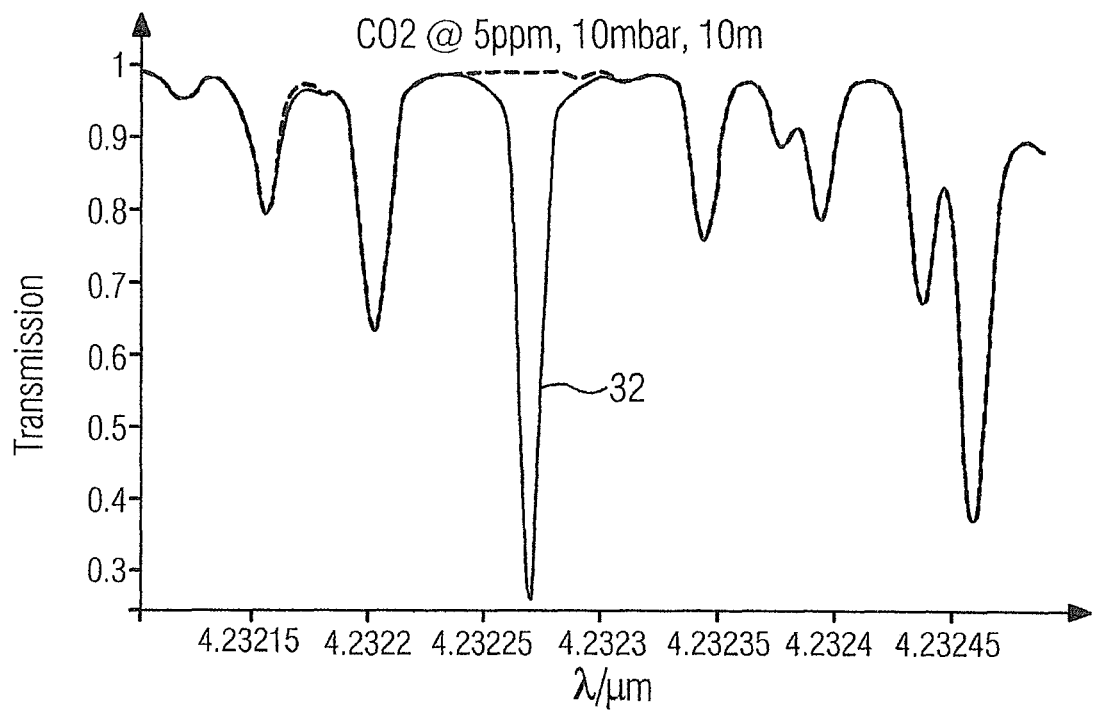

FIG. 8 shows the absorption spectrum of the gas sample 2 in the region of carbon dioxide absorption line 32 at 4.23225 µm.

Figure 9:
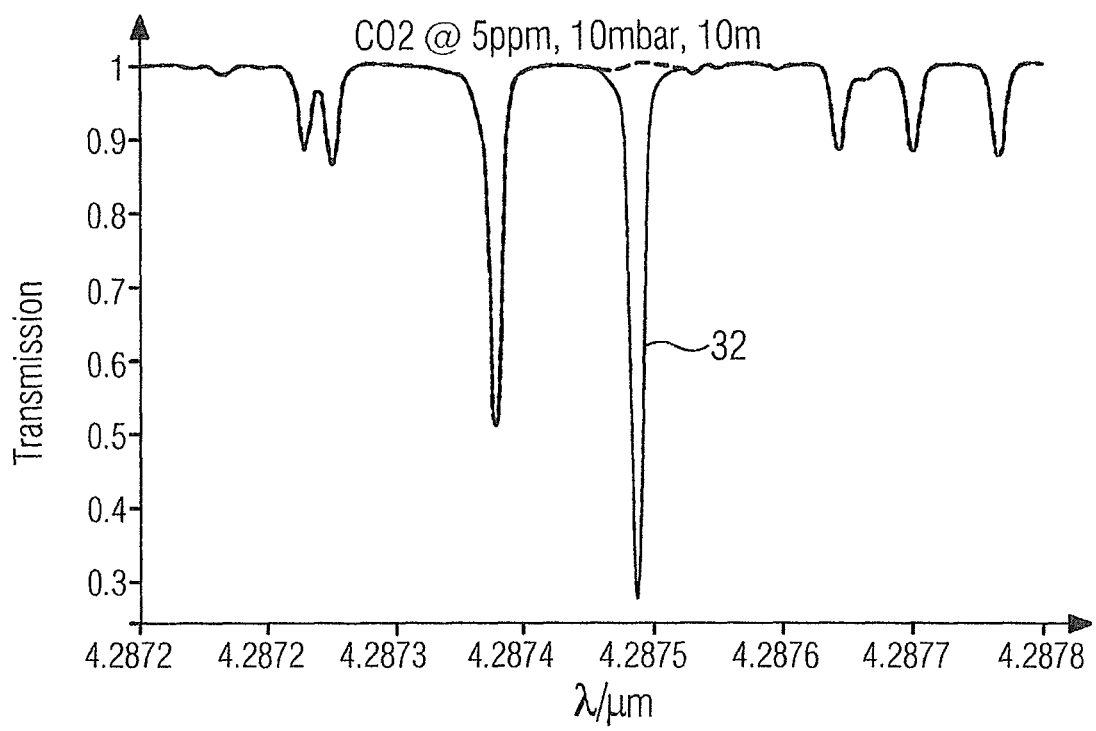

FIG. 9 shows the absorption spectrum of the gas sample 2 in the region of carbon dioxide absorption line 33 at 4.2875 µm.

Figure 10:
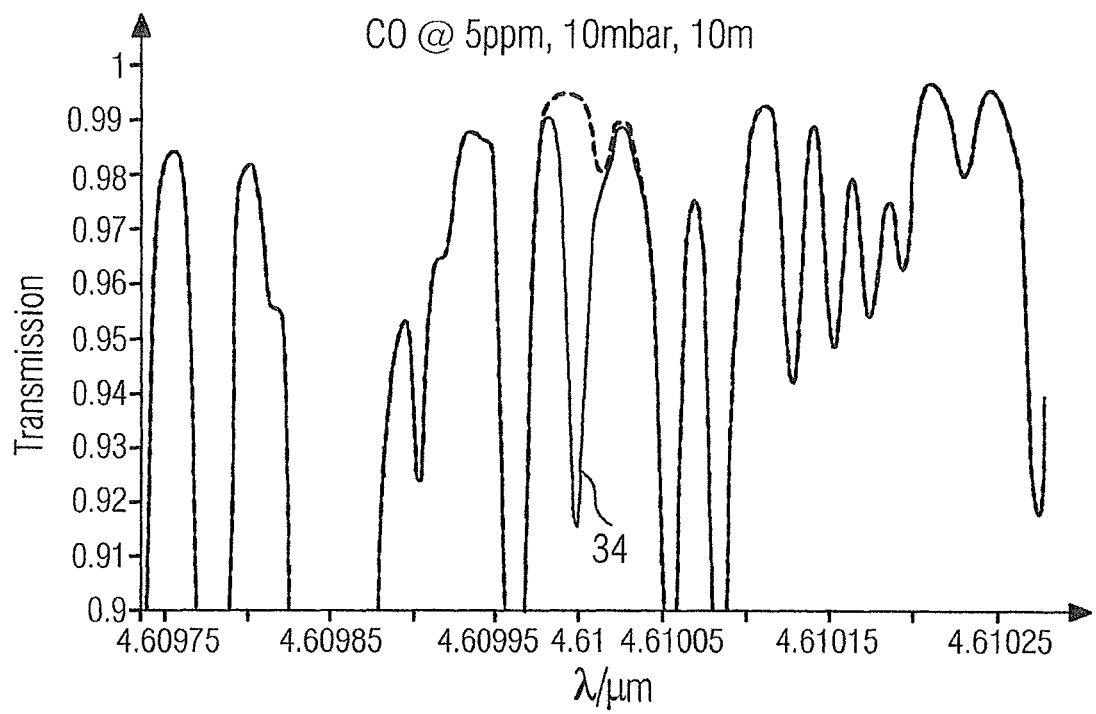

FIG. 10 shows the absorption spectrum of the gas sample 2 in the region of carbon monoxide absorption line 34 at 4.61 µm.

Figure 11:
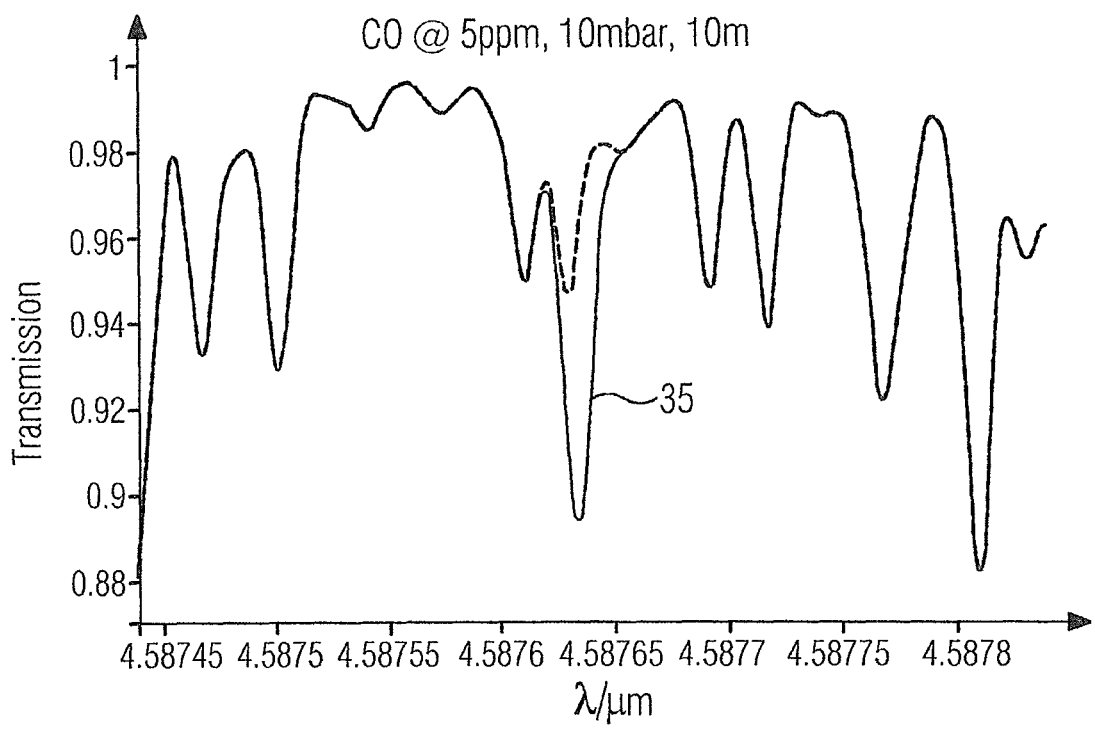

FIG. 11 shows the absorption spectrum of the gas sample 2 in the region of carbon monoxide absorption line 35 at 4.58765 µm.

Figure 12:
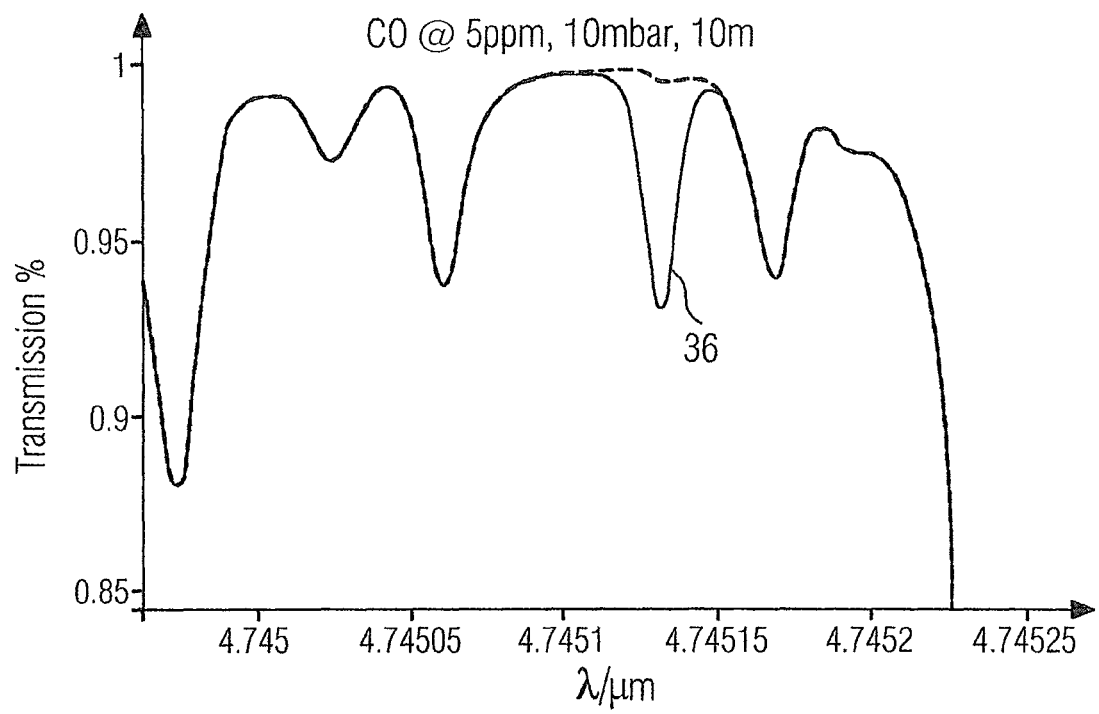

FIG. 12 shows the absorption spectrum of the gas sample 2 in the region of carbon monoxide absorption line 36 at 4.74515 µm.

Figure 13:
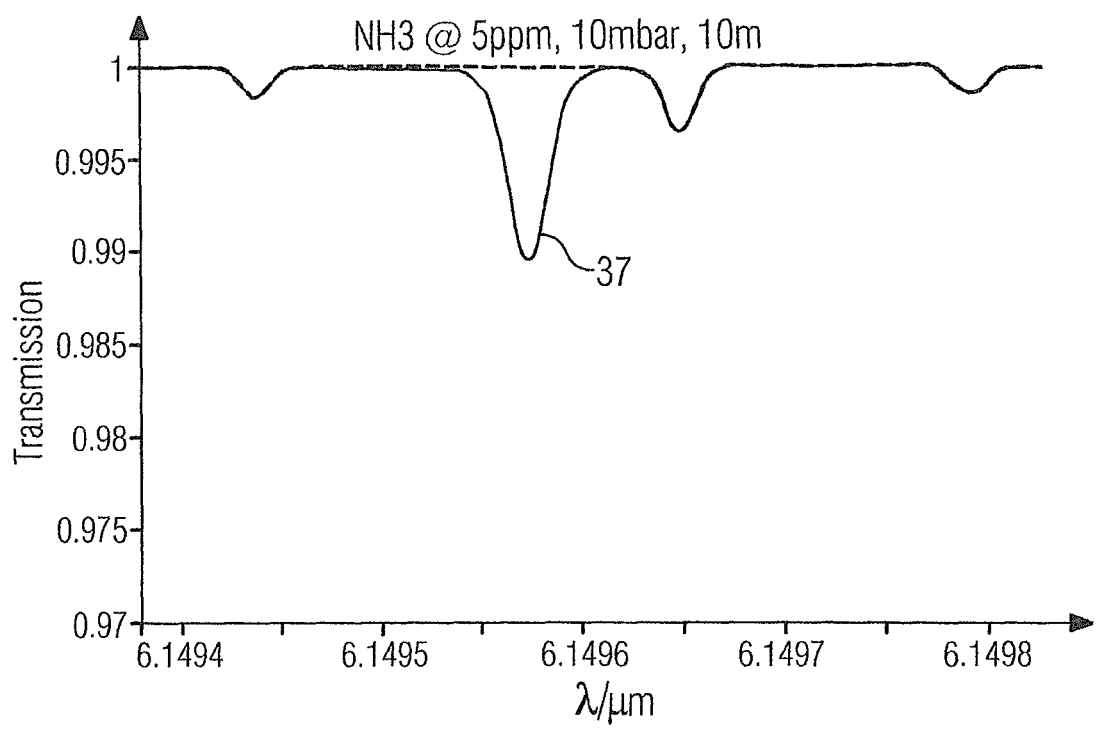

FIG. 13 shows the absorption spectrum of the gas sample 2 in the region of ammonia absorption line 37 at 6.1496 µm.

Figure 14:
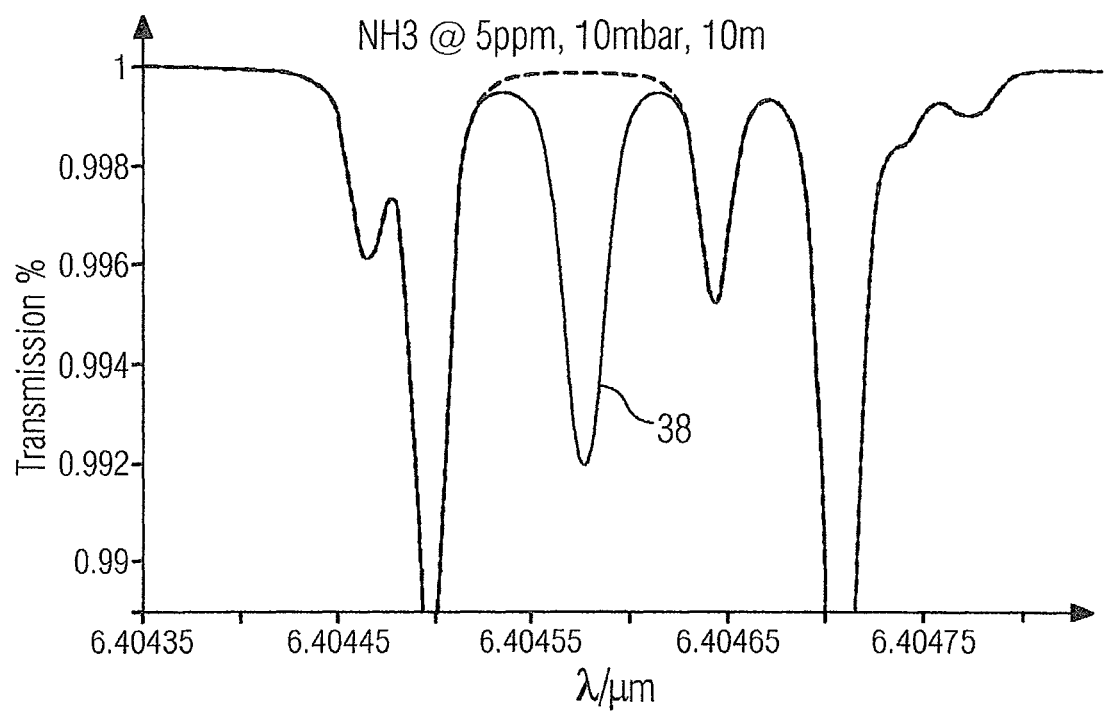

FIG. 14 shows the absorption spectrum of the gas sample 2 in the region of ammonia absorption line 38 at 6.4046 µm.

Figure 15:
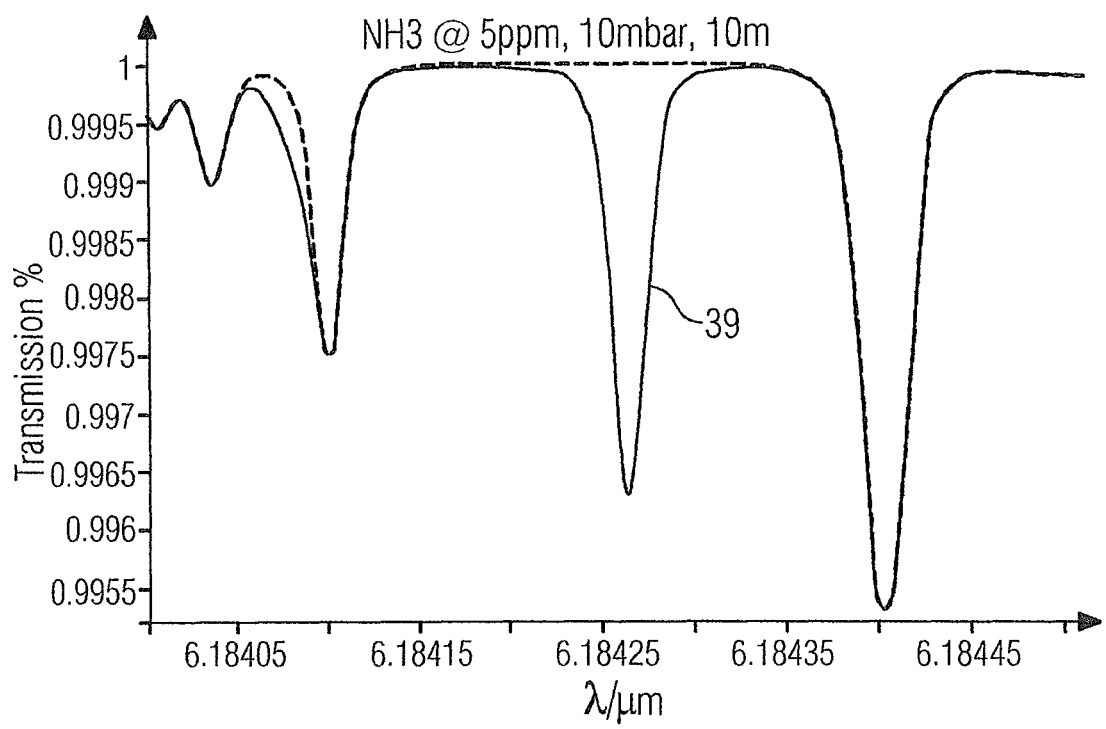

FIG. 15 shows the absorption spectrum of the gas sample 2 in the region of ammonia absorption line 39 at 6.18425 µm.

The absorption lines 26-39 of the illustrated target gases have the advantage that they are not influenced or only to a very small extent by the product gas ethylene or by one another, and thus permit accurate measurement of the target gases with a detection limit of up to 10 ppb.

As the following FIGS. 16 to 29 show, together with the target gases acetylene, carbon dioxide, carbon monoxide and ammonia, the concentration of ethylene can also be determined without an additional laser being required for this purpose. For this purpose, at least one of the target gas absorption lines used for measurement is scanned in a wavelength-dependent manner together with at least one ethylene absorption line located in the vicinity thereof. If several ethylene absorption lines are used to determine the ethylene concentration, this increases the robustness of the measurement.

Figure 16:
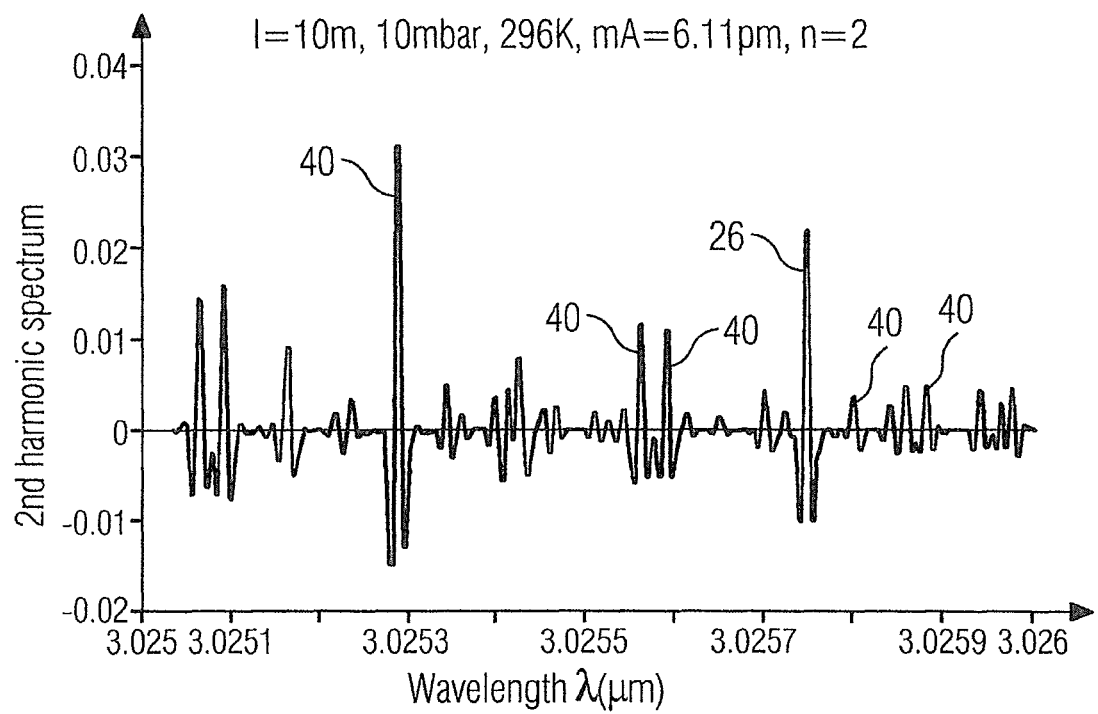

FIG. 16 shows the WMS-2f absorption spectrum of the gas sample 2 in the range of 3.025 µm to 3.026 µm with the acetylene absorption line 26 at 3.02575 µm and ethylene absorption lines 40 at 3.02529 µm, 3.02556 µm, 3.02559 µm, 3.0258 µm and 3.02588 µm.

Figure 17:
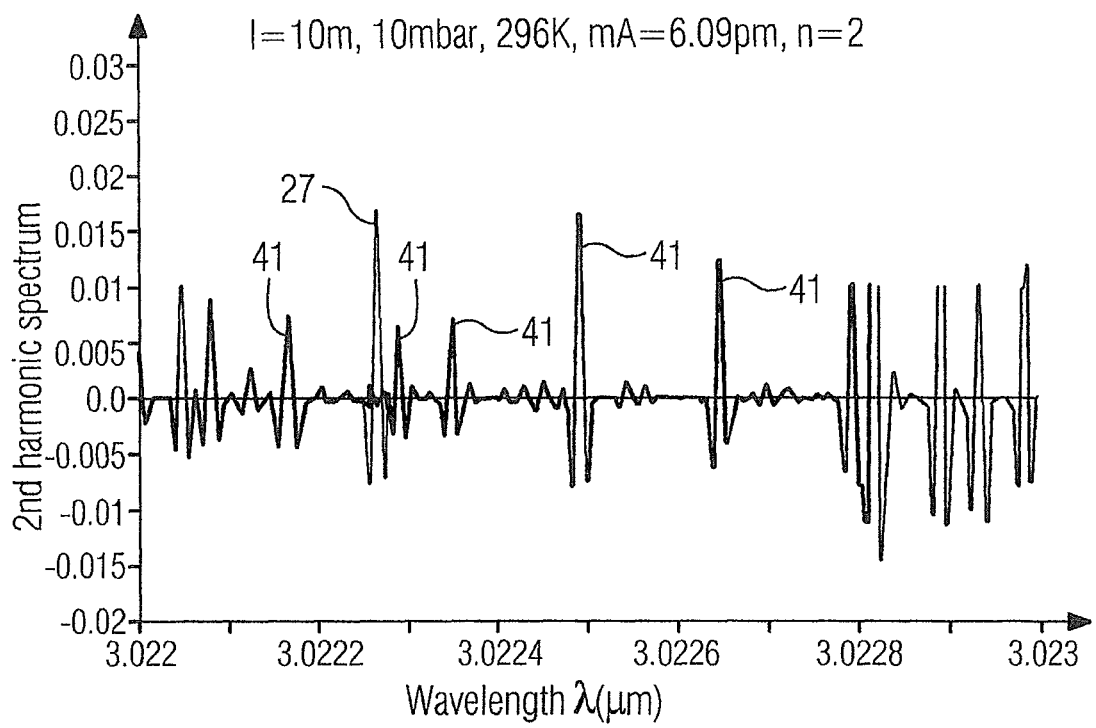

FIG. 17 shows the WMS-2f absorption spectrum of the gas sample 2 in the range of 3.022 µm to 3.023 µm with the acetylene absorption line 27 at 3.0223 µm and ethylene absorption lines 41 at 3.02217 µm, 3.02229 µm, 3.02235 µm, 3.02249 µm and 3.02265 µm.

Figure 18:
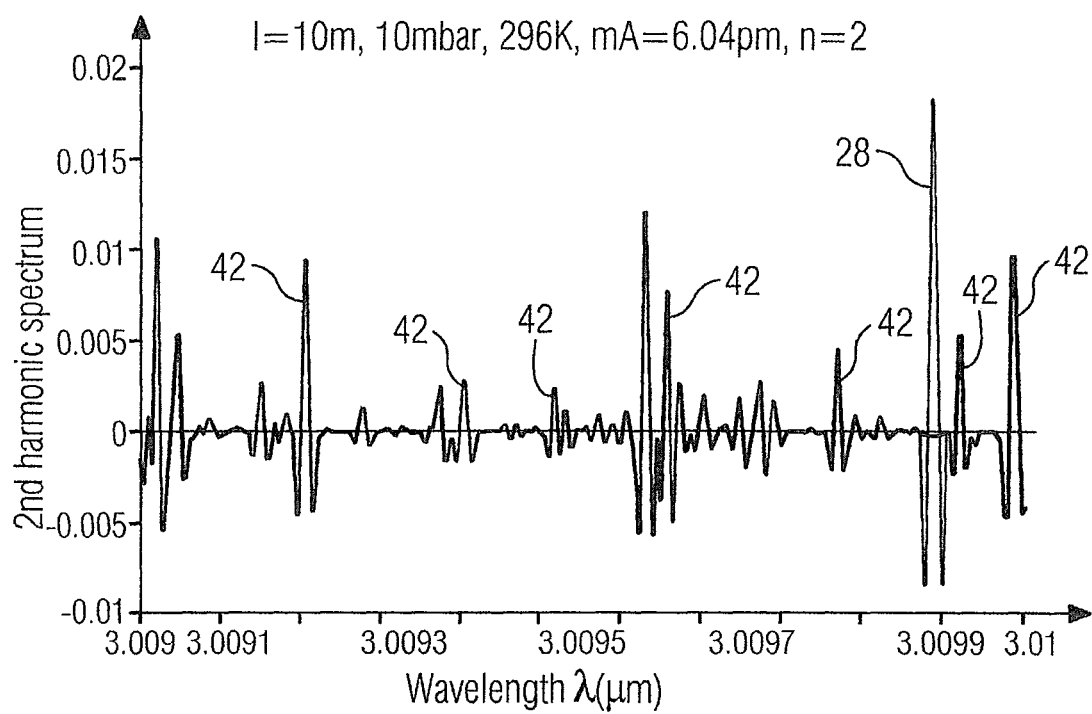

FIG. 18 shows the WMS-2f absorption spectrum of the gas sample 2 in the range of 3.009 µm to 3.01 µm with the acetylene absorption line 28 at 3.0099 µm and ethylene absorption lines 42 at 3.00919 µm, 3.00937 µm, 3.00947 µm, 3.0096 µm, 3.00979 µm, 3.00993 µm and 3.00999 µm.

Figure 19:
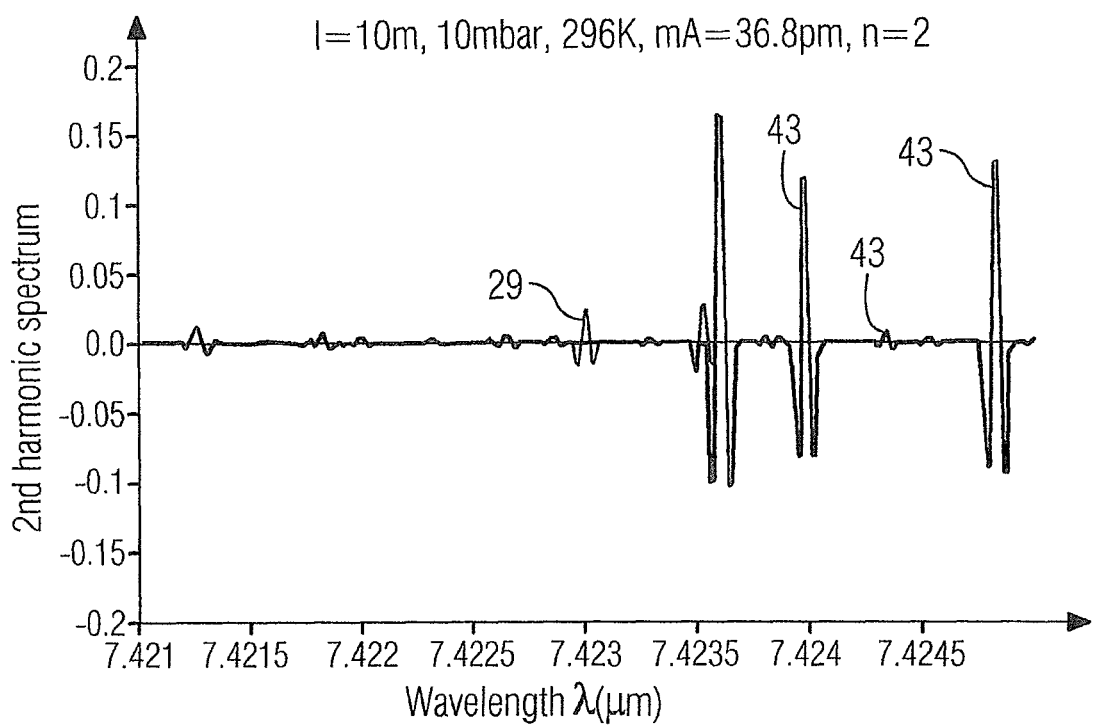

FIG. 19 shows the WMS-2f absorption spectrum of the gas sample 2 in the range of 7.421 µm to 7.425 µm with the acetylene absorption line 29 at 7.423 µm and ethylene absorption lines 43 at 7.42398 µm, 7.42435 µm and 7.42483 µm.

Figure 20:
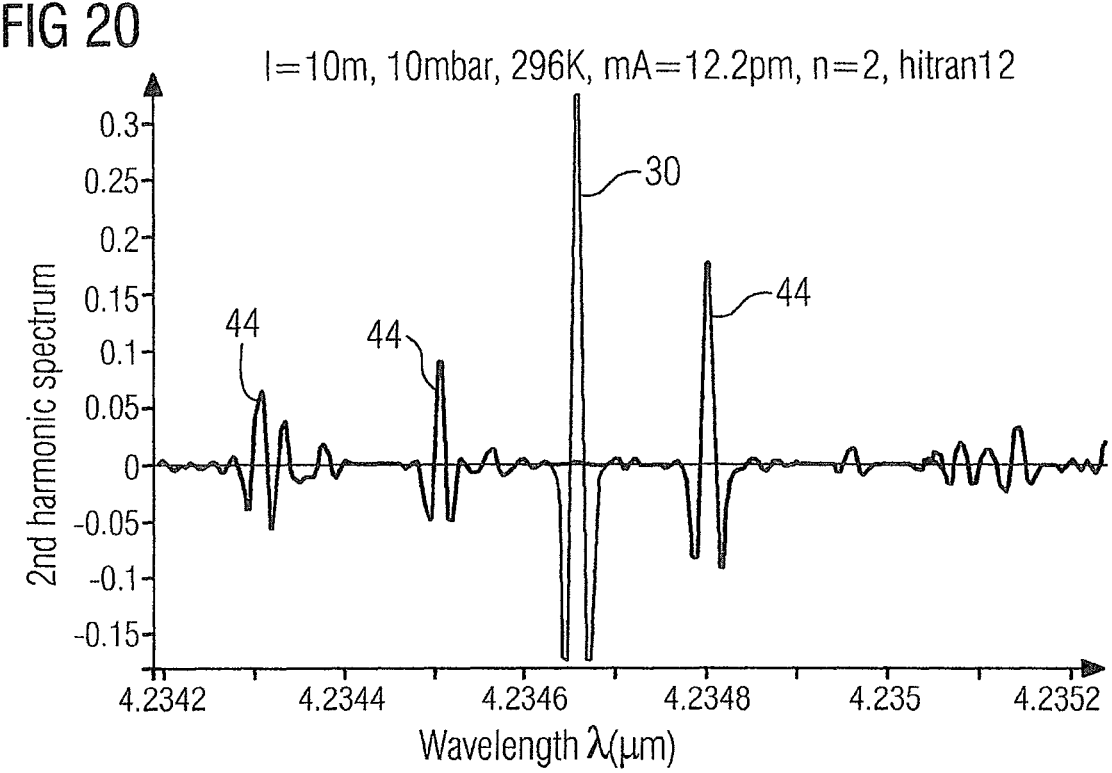

FIG. 20 shows the WMS-2f absorption spectrum of the gas sample 2 in the range of 4.234 µm to 4.235 µm with the carbon dioxide absorption line 30 at 4.2347 µm and ethylene absorption lines 44 at 4.2343 µm, 4.2345 µm and 4.2348 µm.

Figure 21:
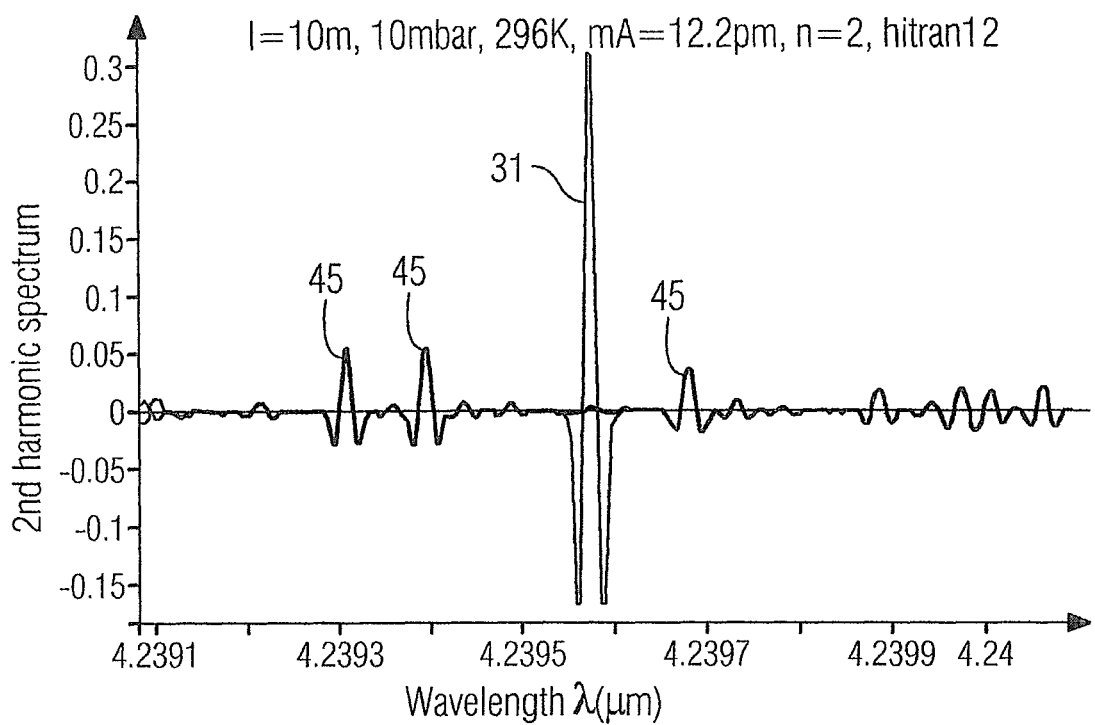

FIG. 21 shows the WMS-2f absorption spectrum of the gas sample 2 in the range of 4.239 µm to 4.24 µm with the carbon dioxide absorption line 31 at 4.2396 µm and ethylene absorption lines 45 at 4.2393 µm, 4.2394 µm and 4.2397 µm.

Figure 22:
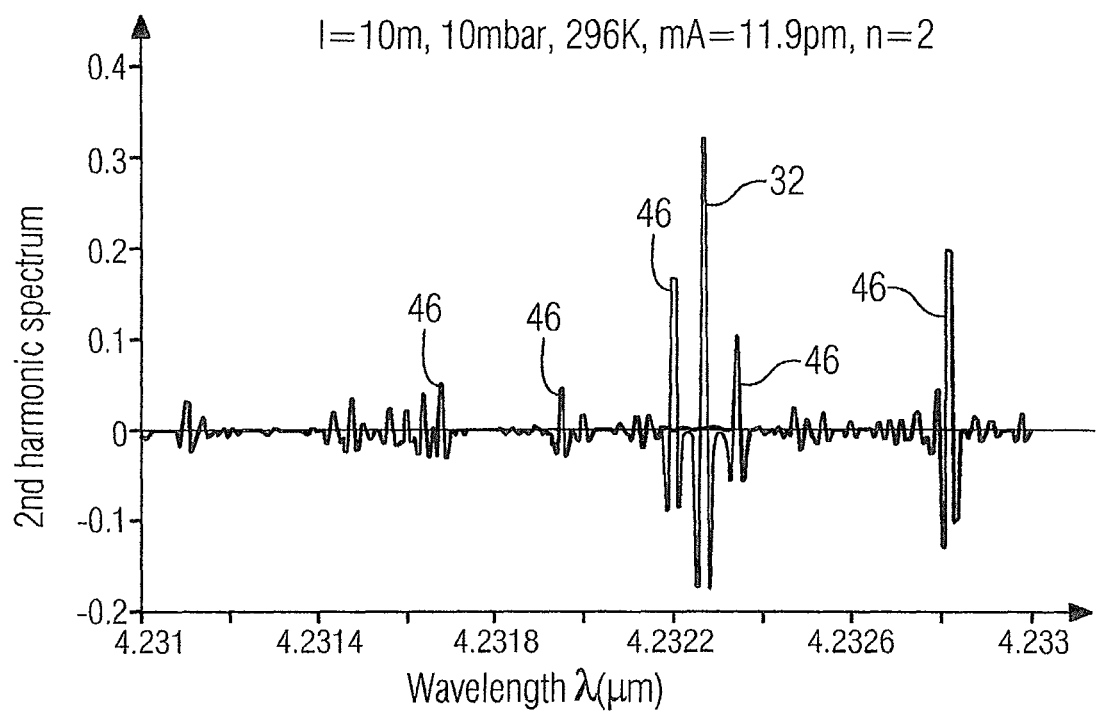

FIG. 22 shows the WMS-2f absorption spectrum of the gas sample 2 in the range of 4.231 µm to 4.232 µm with the carbon dioxide absorption line 32 at 4.23225 µm and ethylene absorption lines 46 at 4.23168 µm, 4.23195 µm, 4.2322 µm, 4.2323 µm and 4.2328 µm.

Figure 23:
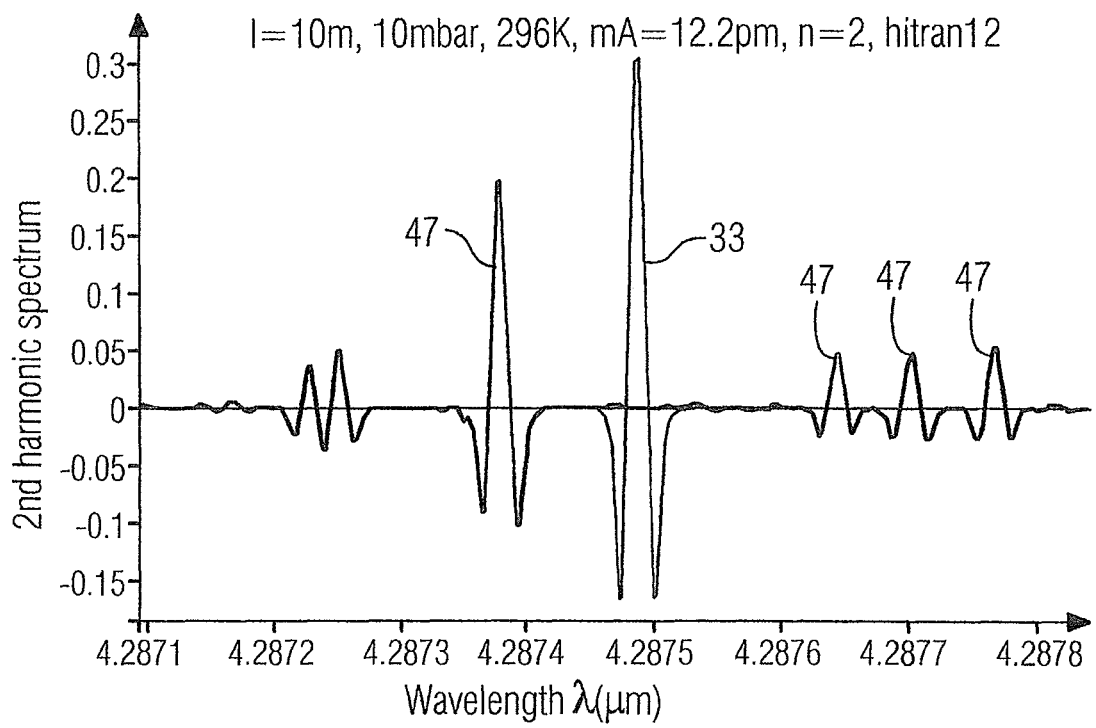

FIG. 23 shows the WMS-2f absorption spectrum of the gas sample 2 in the range of 4.287 µm to 4.288 µm with the carbon dioxide absorption line 33 at 4.2875 µm and ethylene absorption lines 47 at 4.2874 µm, 4.2876 µm (4.28764 µm), 4.2877 µm and 4.2878 µm (4.28777 µm).

Figure 24:
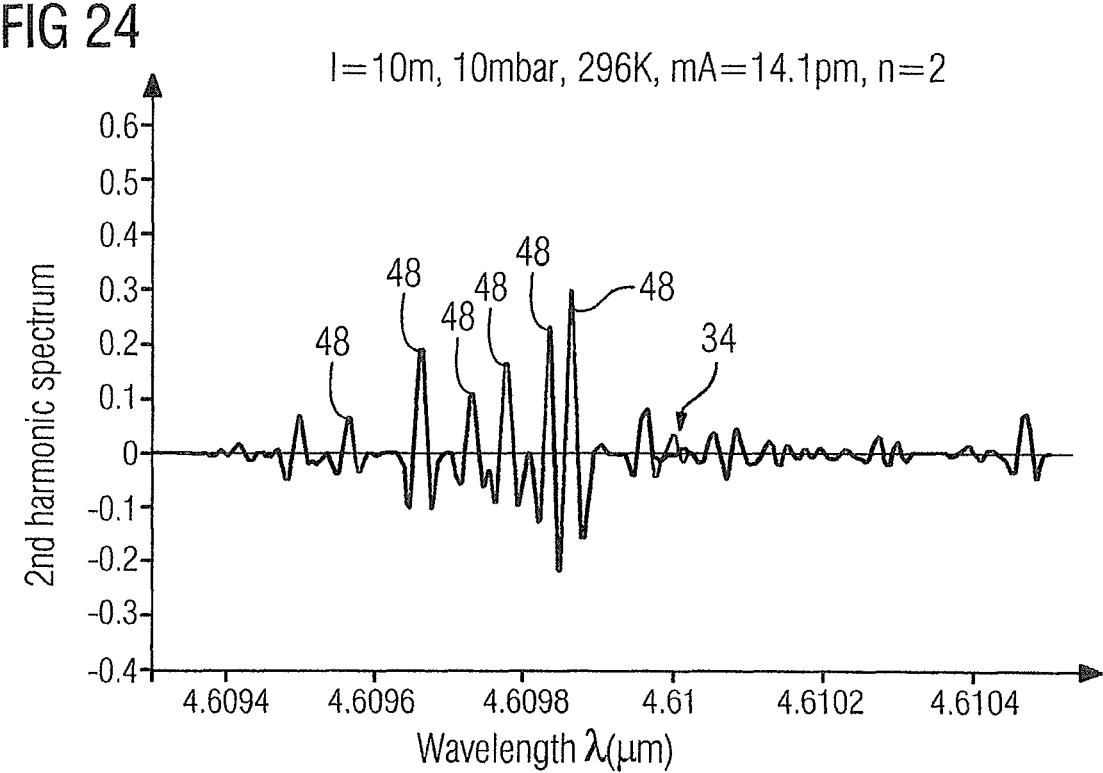

FIG. 24 shows the WMS-2f absorption spectrum of the gas sample 2 in the range of 4.6093 µm to 4.6105 µm with the carbon monoxide absorption line 34 at 4.61 µm and ethylene absorption lines 48 at 4.6096 µm (4.60956 µm), 4.6097 µm (4.60966 µm, 4.60973 µm), 4.6098 µm (4.60978 µm, 4.60984 µm) and 4.6099 µm (4.60986 µm).

Figure 25:
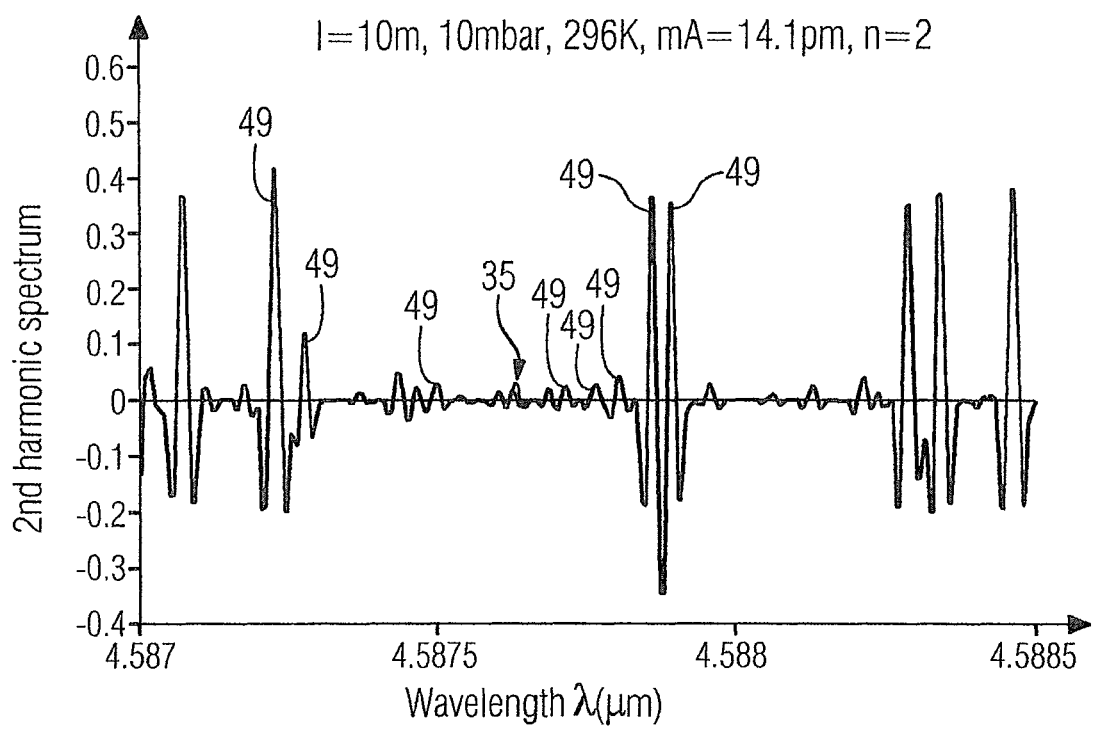

FIG. 25 shows the WMS-2f absorption spectrum of the gas sample 2 in the range of 4.587 µm to 4.5885 µm with the carbon monoxide absorption line 35 at 4.58765 µm and ethylene absorption lines 49 at 4.5872 µm, 4.5873 µm, 4.5875 µm, 4.5877 µm, 4.5878 µm (4.58777 µm, 4.58781 µm) and 4.5879 µm (4.58786 µm, 4.58789 µm).

Figure 26:
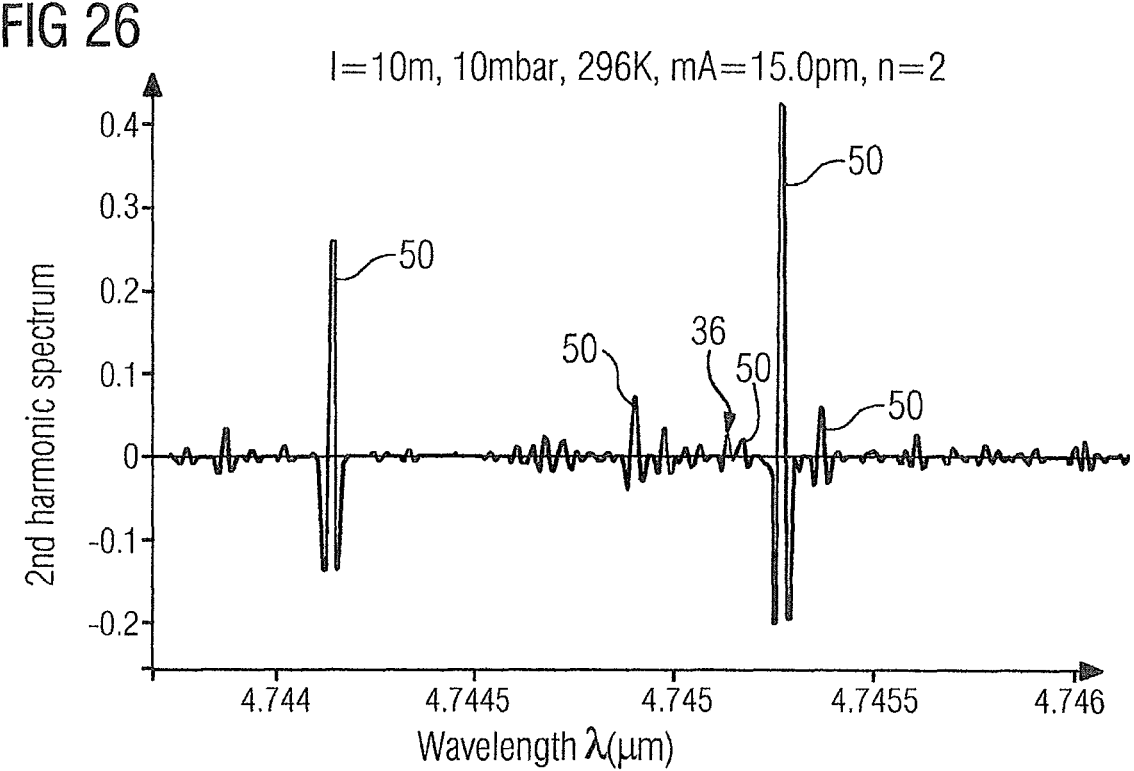

FIG. 26 shows the WMS-2f absorption spectrum of the gas sample 2 in the range of 4.744 µm to 4.7455 µm with the carbon monoxide absorption line 36 at 4.74515 µm and ethylene absorption lines 50 at 4.74417 µm, 4.7449 µm, 4.74517 µm, 4.74527 µm and 4.74537 µm.

Figure 27:
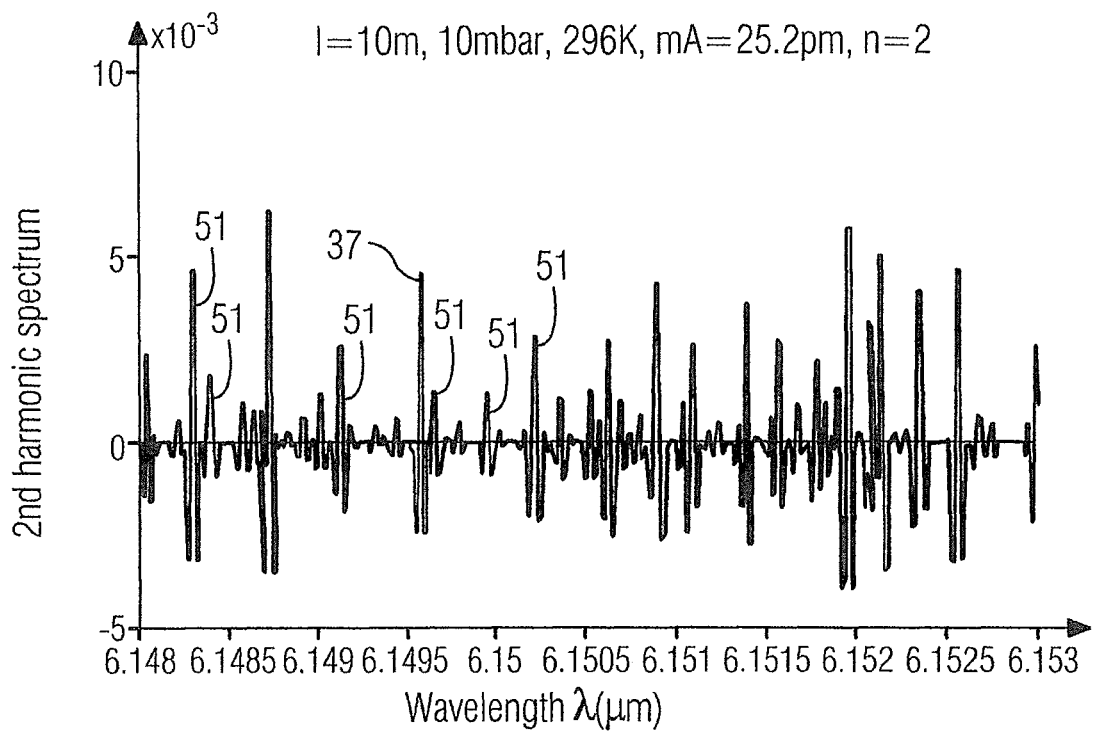

FIG. 27 shows the WMS-2f absorption spectrum of the gas sample 2 in the range of 6.1475 µm to 6.155 µm with the ammonia absorption line 37 at 6.1496 µm and ethylene absorption lines 51 at 6.1483 µm, 6.1484 µm, 6.14912 µm, 6.14965 µm, 6.14979 µm, 6.14996 µm and 6.15022 µm.

Figure 28:
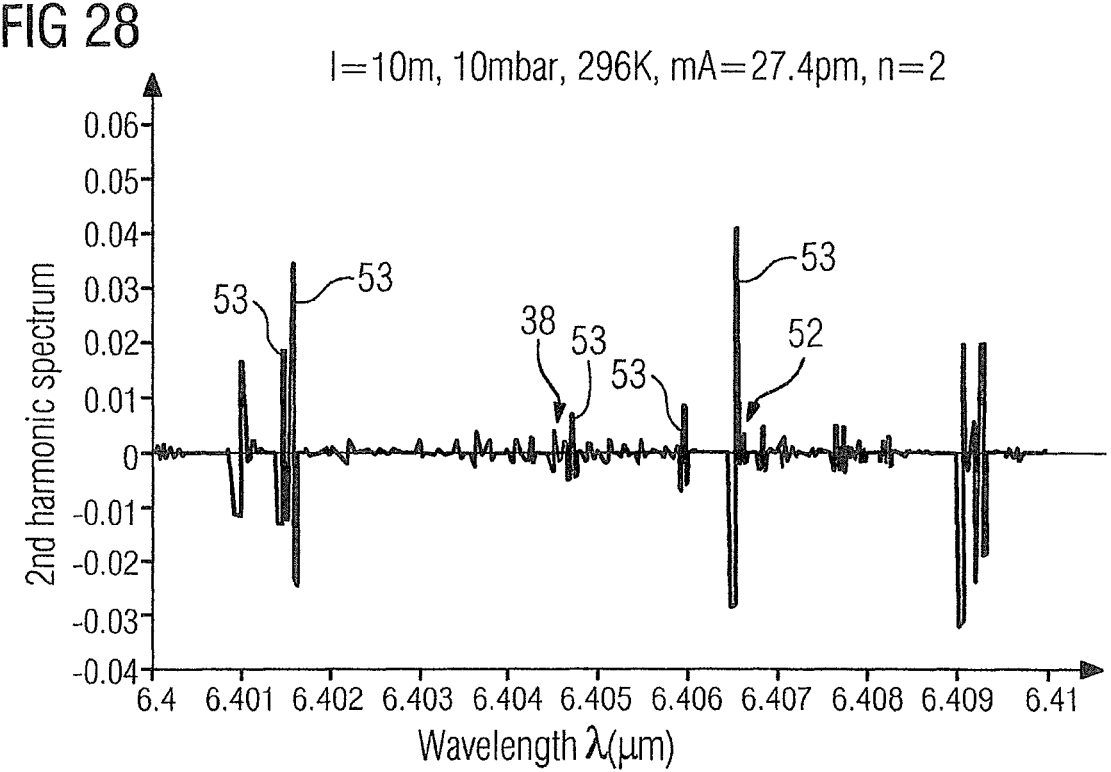

FIG. 28 shows the WMS-2f absorption spectrum of the gas sample 2 in the range of 6.4 µm to 6.41 µm with the ammonia absorption line 38 at 6.4046 µm, the alternatively usable ammonia absorption line 52 at 6.4066 µm and ethylene absorption lines 53 at 6.40146 µm, 6.40156 µm, 6.40471 µm, 6.40594 µm or 6.40651 µm.

Figure 29:
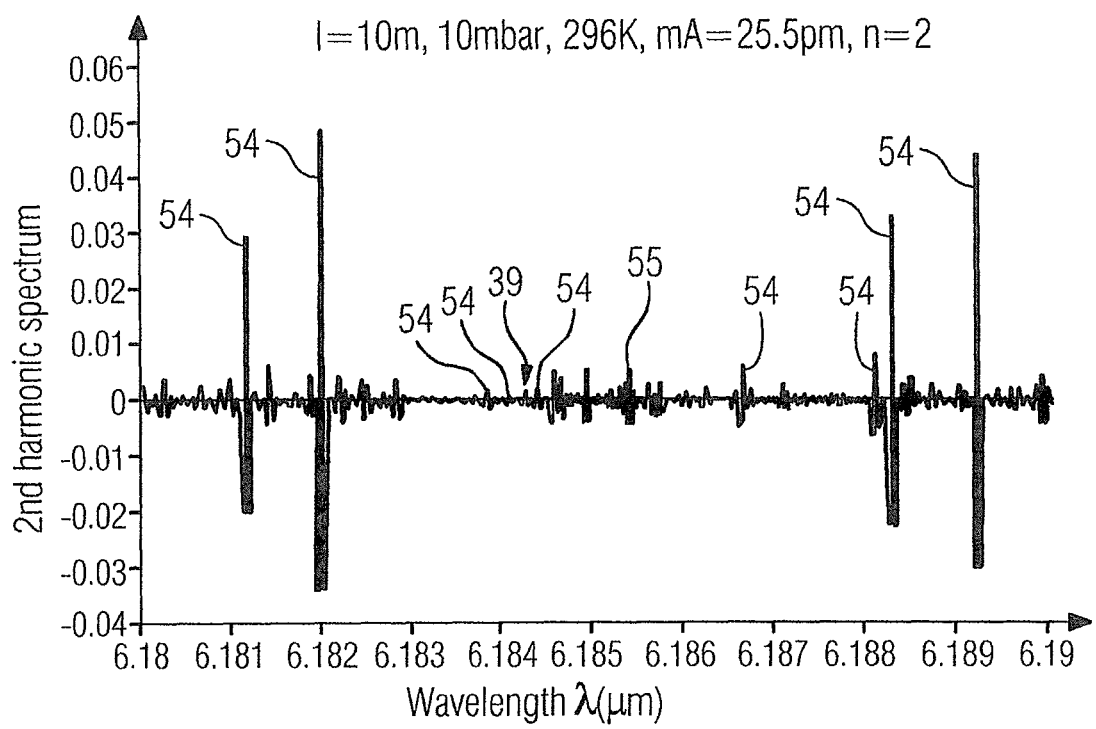

FIG. 29 shows the WMS-2f absorption spectrum of the gas sample 2 in the range of 6.18 µm to 6.19 µm with the ammonia absorption line 39 at 6.18425 µm and ethylene absorption lines 54 at 6.181 µm, 6.182 µm, 6.1838 µm, 6.1841 µm, 6.1844 µm, 6.1866 µm, 6.1881 µm, 6.1883 µm, and 6.1892 µm. In addition, in this wavelength range there is a water absorption line 55 at 6.1854 µm, which permits a concentration determination of water in a measurement range of 100 ppb to 1000 ppm with 100 ppb resolution.

Figure 30:
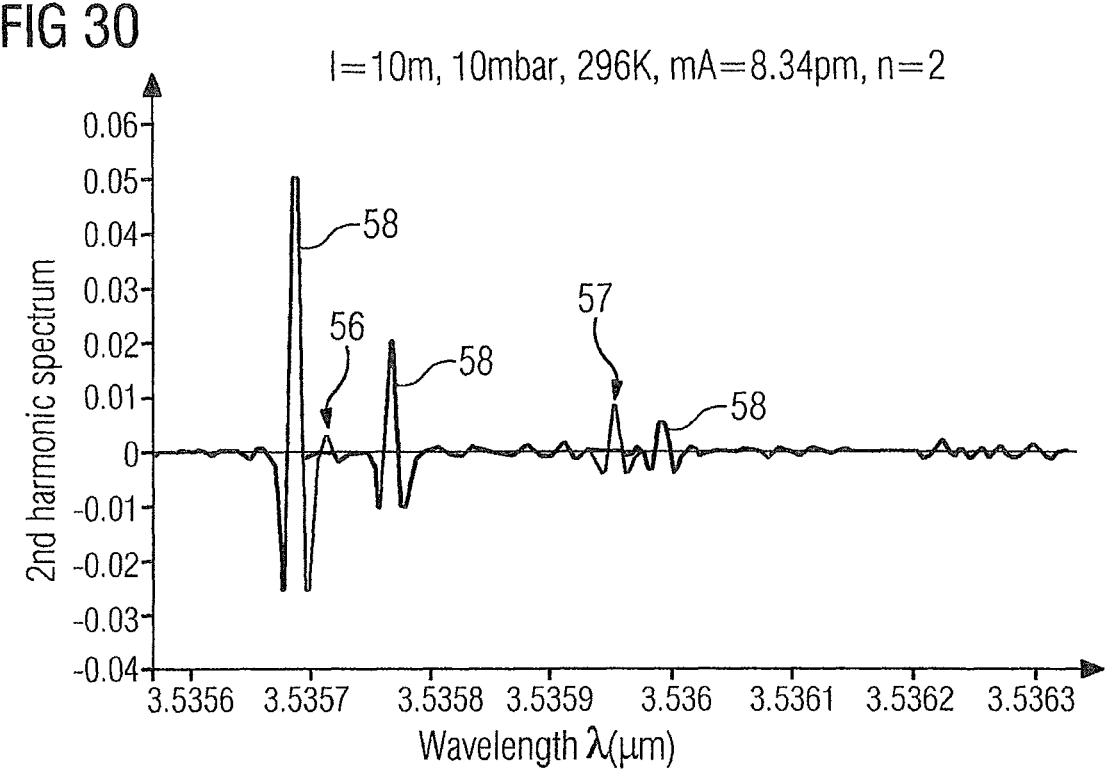
Figure 31:
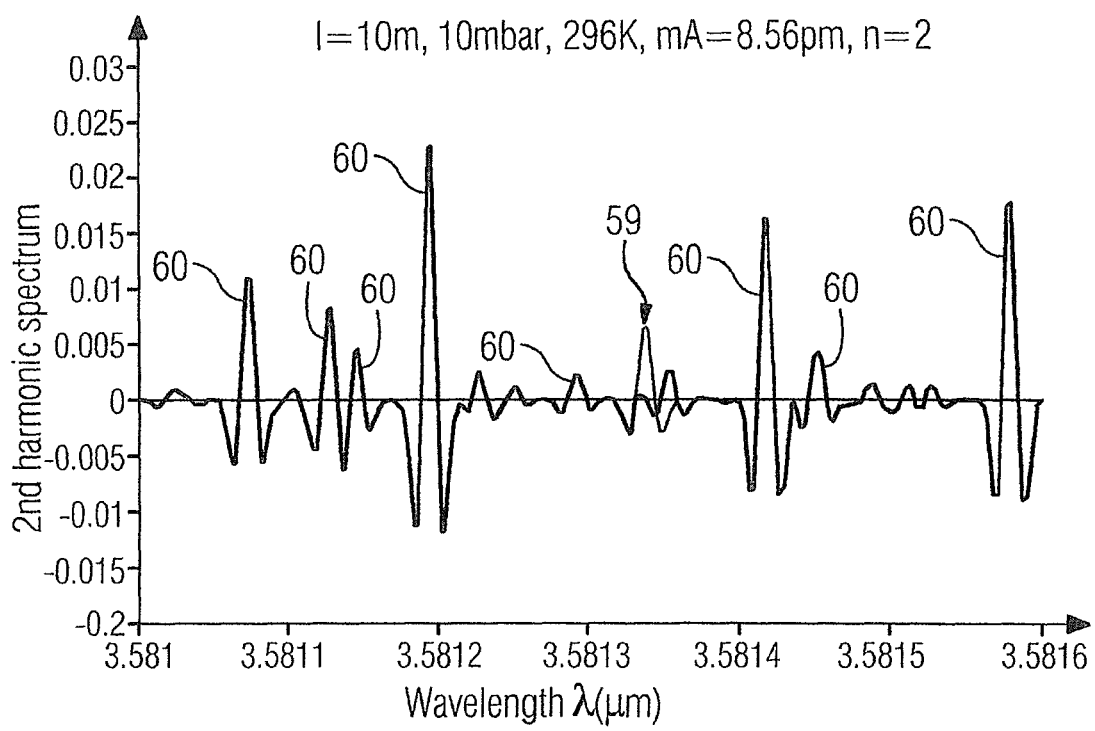

As shown in FIGS. 30 and 31, in addition to the concentrations of acetylene, carbon dioxide, carbon monoxide and ammonia, the concentration of methane, optionally together with the concentration of ethylene, can be determined via a further laser having a tuning range of approximately 3.5356 µm to 3.5363 µm or 3.581 µm to 3.5817 µm.

FIG. 30 shows the WMS-2f absorption spectrum of the gas sample 2 in the range of 3.5356 µm to 3.5363 µm with two methane absorption lines 56, 57 at 3.53571 µm and 3.53595 µm and ethylene absorption lines 58 at 3.53569 µm, 3.53577 µm and 3.53599 µm.

FIG. 31 shows the WMS-2f absorption spectrum of the gas sample 2 in the range of 3.581 µm to 3.5817 µm with a methane absorption line 59 at 3.58134 µm and ethylene absorption lines 60 at 3.58107 µm, 3.58113 µm, 3.58115 µm, 3.58119 µm, 3.58129 µm, 3.58142 µm, 3.58145 µm and 3.58158 µm.

Figure 32:
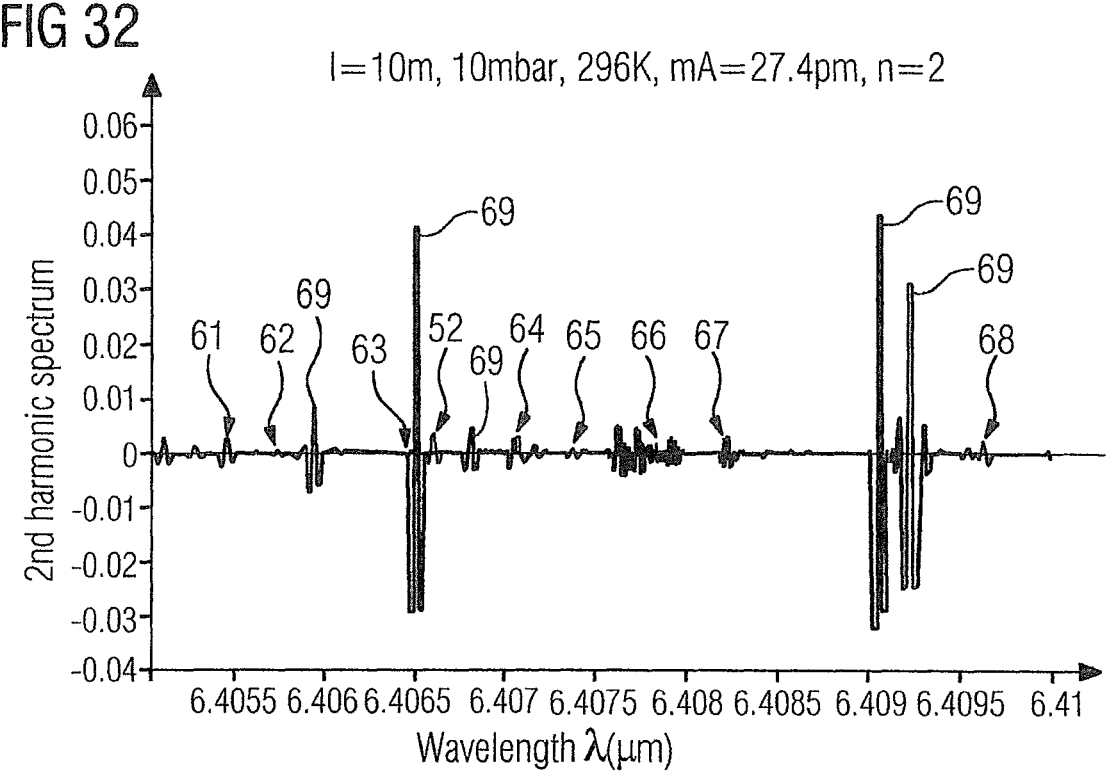

Finally, the concentration of the ethane can also be determined. FIG. 32 shows the WMS-2 f absorption spectrum of the gas sample 2 in the range from 6.4 µm to 6.41 µm with ethane absorption lines 61-68 at 6.40545 µm, 6.40574 µm, 6.40646 µm, 6.40707 µm, 6.40737 µm, 6.40782 µm, 6.4082 µm and 6.40962 µm, and also ethylene absorption lines 69 at 6.40594 µm, 6.40651 µm, 6.40681 µm, 6.40906 µm and 6.40922 µm. In this wavelength range, the ammonia absorption line 52 shown in FIG. 28 is also at 6.4066 µm, so that the concentrations of ammonia, ethane and ethylene can be determined simultaneously with only one laser. The same also applies to the ammonia absorption line 38 at 6.4046 µm shown in FIG. 14 which, because of its proximity to the above-mentioned ethane absorption lines 61-68 and ethylene absorption lines 69, can be scanned together with at least one of these in a wavelength-dependent manner. In both cases, only five lasers are required, for example, for measuring acetylene, carbon dioxide, carbon monoxide, ammonia, methane, ethane, and ethylene (up to >99%).

Figure 33:
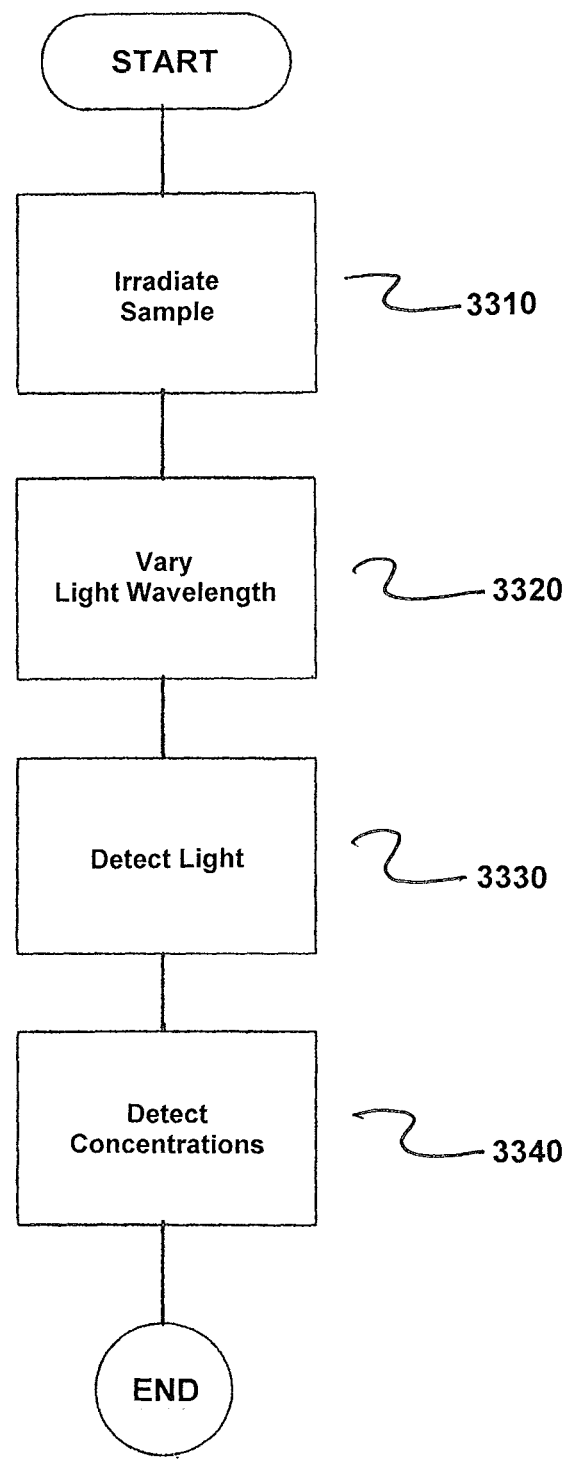
FIG. 33 is a flowchart of the method in accordance with the invention.

FIG. 33 is a flowchart of the method for determining foreign gases in ethylene with a degree of purity up to greater than 99%. The method comprises irradiating a sample 2 of the ethylene in a measuring cell 1 with light 14, as indicated in step 3310.

Next, the wavelength of the light 14 is varied to scan selected absorption lines of the foreign gases in a wavelength-dependent manner, as indicated in step 3320. Next, the light is detected after passing said light through the sample 2, as indicated in step 3330.

Next, concentrations of the foreign gases are determined based on the wavelength-specific absorption of the light 14 at points of the scanned selected absorption lines, as indicated in step 3340.

In accordance with the invention, the concentrations of the foreign gases acetylene, carbon dioxide, carbon monoxide and ammonia can be determined based on absorptions at one of their following absorption lines in each case for (i) acetylene absorption lines at 3.02575 µm, 3.0223 µm, 3.0099 µm or 7.423 µm, (ii) carbon dioxide absorption lines at 4.2347 µm, 4.2396 µm, 4.23225 µm or 4.2875 µm, (iii) carbon monoxide absorption lines at 4.61 µm, 4.58765 µm or 4.74515 µm, (iv) ammonia absorption lines at 6.1496 µm, 6.4046 µm, 6.4066 µm or 6.18425 µm.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining foreign gases in ethylene with a degree of purity up to greater than 99%, the method comprising:
   irradiating a sample of the ethylene in a measuring cell with light;
   varying the wavelength of the light to scan selected absorption lines of the foreign gases in a wavelength-dependent manner;
   detecting the light after passing said light through the sample; and
   determining concentrations of the foreign gases based on the wavelength-specific absorption of the light at points of the scanned selected absorption lines;
   wherein the concentrations of the foreign gases acetylene, carbon dioxide, carbon monoxide and ammonia are determinable based on absorptions at one of their following absorption lines in each case for (i) acetylene absorption lines at 3.02575 µm, 3.0223 µm, 3.0099 µm or 7.423 µm, (ii) carbon dioxide absorption lines at 4.2347 µm, 4.2396 µm, 4.23225 µm or 4.2875 µm, (iii) carbon monoxide absorption lines at 4.61 µm, 4.58765 µm or 4.74515 µm, (iv) ammonia absorption lines at 6.1496 µm, 6.4046 µm, 6.4066 µm or 6.18425 µm.

2. The method as claimed in claim 1, wherein the concentration of the foreign gas methane is additionally determined based on the absorption at one of the following absorption lines comprising methane absorption lines at 3.53571 µm, 3.53595 µm or 3.58134 µm.

3. The method as claimed in claim 1, wherein the concentration of the foreign gas ethane is additionally determined based on the absorption at one of the following absorption lines comprising ethane absorption lines at 6.40545 µm, 6.40574 µm, 6.40646 µm, 6.40707 µm, 6.40737 µm, 6.40782 µm, 6.4082 µm or 6.40962 µm.

4. The method as claimed in claim 2, wherein the concentration of the foreign gas ethane is additionally determined based on the absorption at one of the following absorption lines comprising ethane absorption lines at 6.40545 µm, 6.40574 µm, 6.40646 µm, 6.40707 µm, 6.40737 µm, 6.40782 µm, 6.4082 µm or 6.40962 µm.

5. The method as claimed in claim 3, wherein the ethane absorption line is scanned in a wavelength-dependent manner together with the ammonia absorption line at 6.4046 µm or at 6.4066 µm.

6. The method as claimed in claim 1, wherein the concentration of the foreign gas water is additionally determined based on the absorption at a water absorption line at 6.1854 µm.

7. The method as claimed in claim 6, wherein the water absorption line is scanned in a wavelength-dependent manner together with the ammonia absorption line at 6.18425 µm.

8. The method as claimed in claim 1, wherein the concentration of the ethylene is additionally determined based on an absorption in at least one ethylene absorption line which is in proximity to at least one of the foreign gas absorption lines and is scanned together with the latter in a wavelength-dependent manner.

9. The method as claimed in claim 8, wherein the concentration of the ethylene is determined based on the absorption in one of the following absorption lines comprising ethylene absorption lines at 3.02529 µm, 3.02556 µm, 3.02559 µm, 3.0258 µm or 3.02588 µm in proximity to the acetylene absorption line at 3.02575 µm.

10. The method as claimed in claim 8, wherein the concentration of the ethylene is determined based on the absorption in one of the following absorption lines comprising ethylene absorption lines at 3.02217 µm, 3.02229 µm, 3.02235 µm, 3.02249 µm or 3.02265 µm in proximity to the acetylene absorption line at 3.0223 µm.

11. The method as claimed in claim 8, wherein the concentration of the ethylene is determined based on the absorption in one of the following absorption lines comprising ethylene absorption lines at 3.00919 µm, 3.00937 µm, 3.00947 µm, 3.0096 µm, 3.00979 µm, 3.00993 µm or 3.00999 µm in proximity to the acetylene absorption line at 3.0099 µm.

12. The method as claimed in claim 8, wherein the concentration of the ethylene is determined based on the absorption in one of the following absorption lines comprising ethylene absorption lines at 7.42398 µm, 7.42435 µm or 7.42483 µm in proximity to the acetylene absorption line at 7.423 µm.

13. The method as claimed in claim 8, wherein the concentration of the ethylene is determined based on the absorption in one of the following absorption lines comprising Ethylene absorption lines at 4.2343 µm, 4.2345 µm or 4.2348 µm in proximity to the carbon dioxide absorption line at 4.2347 µm.

14. The method as claimed in claim 8, wherein the concentration of the ethylene is determined based on the absorption in one of the following absorption lines comprising ethylene absorption lines at 4.2393 µm, 4.2394 µm or 4.2397 µm in proximity to the carbon dioxide absorption line at 4.2396 µm.

15. The method as claimed in claim 8, wherein the concentration of the ethylene is determined based on the absorption in one of the following absorption lines comprising ethylene absorption lines at 4.23168 µm, 4.23195 µm, 4.2322 µm, 4.2323 µm or 4.2328 µm in proximity to the carbon dioxide absorption line at 4.23225 µm.

16. The method as claimed in claim 8, wherein the concentration of the ethylene is determined based on the absorption in one of the following absorption lines comprising ethylene absorption lines at 4.2874 µm, 4.2876 µm, 4.2877 µm or 4.2878 µm in proximity to the carbon dioxide absorption line at 4.2875 µm.

17. The method as claimed in claim 8, wherein the concentration of the ethylene is determined based on the absorption in one of the following absorption lines comprising ethylene absorption lines at 4.6096 µm, 4.6097 µm, 4.6098 µm or 4.6099 µm in proximity to the carbon monoxide absorption line at 4.61 µm.

18. The method as claimed in claim 8, wherein the concentration of the ethylene is determined based on the absorption in one of the following absorption lines comprising ethylene absorption lines at 4.5872 µm, 4.5873 µm, 4.5875 µm, 4.5877 µm, 4.5878 µm or 4.5879 µm in proximity to the carbon monoxide absorption line at 4.58765 µm.

19. The method as claimed claim 8, wherein the concentration of the ethylene is determined based on the absorption in one of the following absorption lines comprising ethylene absorption lines at 4.74417 µm, 4.7449 µm, 4.74517 µm, 4.74527 µm or 4.74537 µm in proximity to the carbon monoxide absorption line at 4.74515 µm.

20. The method as claimed in claim 8, wherein the concentration of the ethylene is determined based on the absorption in one of the following absorption lines comprising ethylene absorption lines at 6.1483 µm, 6.1484 µm, 6.14912 µm, 6.14965 µm, 6.14979 µm, 6.14996 µm or 6.15022 µm in proximity to the ammonia absorption line at 6.1496 µm.

21. The method as claimed in claim 8, wherein the concentration of the ethylene is determined based on the absorption in one of the following absorption lines comprising ethylene absorption lines at 6.40146 µm, 6.40156 µm, 6.40471 µm, 6.40594 µn or 6.40651 µn in proximity to the ammonia absorption line at 6.4046 µm or 6.4066 µm.

22. The method as claimed in claim 8, wherein the concentration of the ethylene is determined based on the absorption in one of the following absorption lines ethylene absorption lines at 6.181 µm, 6.182 µm, 6.1838 µm, 6.1841 µm, 6.1844 µm, 6.1866 µm, 6.1881 µm, 6.1883 µm or 6.1892 µm in proximity to the ammonia absorption line at 6.18425 µm.

23. The method as claimed in claim 8, wherein the concentration of the ethylene is determined based on the absorption in one of the following absorption lines comprising ethylene absorption lines at 3.53569 µm, 3.53577 µm or 3.53599 µm in proximity to the methane absorption line at 3.53571 µm or 3.53595 µm.

24. The method as claimed in claim 8, wherein the concentration of the ethylene is determined based on the absorption in one of the following absorption lines comprising ethylene absorption lines at 3.58107 µm, 3.58113 µm, 3.58115 µm, 3.58119 µm, 3.58129 µm, 3.58142 µm, 3.58145 µm or 3.58158 µm in proximity to the methane absorption line at 3.58134 µm.

25. The method as claimed in claim 8, wherein the concentration of the ethylene is determined based on the absorption in one of the following absorption lines comprising ethylene absorption lines at 6.40594 μm, 6.40651 μm, 6.40681 μm, 6.40906 μm or 6.40922 μm in proximity to the ethane absorption line at 6.40545 μm, 6.40574 μm, 6.40646 μm, 6.40707 μm, 6.40737 μm, 6.40782 μm, 6.4082 μm or 6.40962 μm.

26. The method as claimed in claim 1, wherein the light is generated via a light source comprising at least one single light source of one of (i) a Quantum Cascade Laser (QCL), (ii) Interband Cascade Laser (ICL) and (iii) a Vertical Cavity Surface Emitting Laser (VCSEL).

27. The method as claimed in claim 1, wherein the sample in a measuring cell is brought to a pressure in the range between 10 mbar and 200 mbar.

28. The method as claimed in claim 27, wherein the sample in a measuring cell is brought to a pressure of less than 100 mbar.

29. The method as claimed in claim 28, wherein the sample in a measuring cell is brought to a pressure of less than 30 mbar.

30. The method as claimed in claim 1, wherein the measuring cell comprises a multipass-measuring cell having a multiply folded beam path.

31. The method as claimed in claim 30, wherein a length of the beam path is between 5 m and 100 m.

32. The method as claimed in claim 31, wherein the length of the beam path is approximately 10 m.

33. The method as claimed in claim 1, wherein the measurement is performed in accordance with one of (i) direct absorption spectroscopy and (ii) wavelength modulation spectroscopy (WMS).

34. A measurement system for determining foreign gases in ethylene with a degree of purity up to greater than 99%, comprising:

a measuring cell for receiving a sample of the ethylene;
a light source which is tunable in relation to a wavelength and which passes through the measuring cell;
a control device which controls the light source;
a detector which detects light of the light source after transillumination of the sample; and
an evaluation device which is arranged downstream of the detector and which determines concentrations of foreign gases based on their wavelength-specific absorption of the light;
wherein the light source and control device are configured to tune the wavelength of the light over a range that contains one of the following absorption lines for each of the foreign gases acetylene, carbon dioxide, carbon monoxide and ammonia, and
wherein the evaluation device is configured to determine concentrations of the foreign gases acetylene, carbon dioxide, carbon monoxide and ammonia based on absorptions for one of the following absorption lines comprising acetylene absorption lines at 3.02575 μm, 3.0223 μm, 3.0099 μm or 7.423 μm, carbon dioxide absorption lines at 4.2347 μm, 4.2396 μm, 4.23225 μm or 4.2875 μm, carbon monoxide absorption lines at 4.61 μm, 4.58765 μm or 4.74515 μm, and ammonia absorption lines at 6.1496 μm, 6.4046 μm, 6.4066 μm or 6.18425 μm.

35. The method as claimed in claim 1, wherein the light is generated via a light source and controlled successively in time-division multiplex.

36. The measurement system as claimed in claim 34, wherein the light source is controlled successively in time-division multiplex.

\* \* \* \* \*